US012617413B1

(12) United States Patent
Pronovost et al.

(10) Patent No.: US 12,617,413 B1
(45) Date of Patent: May 5, 2026

(54) CONTRASTIVE TRAINING OF OBJECT TRAJECTORY ENCODERS AND TEXT ENCODERS

(71) Applicant: Zoox, Inc., Foster City, CA (US)

(72) Inventors: Ethan Miller Pronovost, Redwood City, CA (US); Sean Konz, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 133 days.

(21) Appl. No.: 18/385,736

(22) Filed: Oct. 31, 2023

(51) Int. Cl.
*B60W 50/00* (2006.01)
*B60W 50/14* (2020.01)
*G06F 40/40* (2020.01)

(52) U.S. Cl.
CPC ........ *B60W 50/0097* (2013.01); *B60W 50/14* (2013.01); *G06F 40/40* (2020.01); *B60W 2400/00* (2013.01)

(58) Field of Classification Search
CPC ............. B60W 50/0097; B60W 50/14; B60W 2400/00; G06F 40/40; B60Y 2300/08; G08G 1/00; B60Q 2300/10; B60Q 2300/30; B60Q 2300/40
See application file for complete search history.

(56) References Cited

U.S. PATENT DOCUMENTS 12,027,052 B2 7/2024 Pueschl et al.
2019/0304156 A1* 10/2019 Amer .................... G06F 40/279

2021/0097148 A1 4/2021 Bagschik et al.
2021/0341921 A1 11/2021 Davis et al.
2021/0403036 A1 12/2021 Danna
2021/0406262 A1 12/2021 Unnikrishnan
2022/0156605 A1 5/2022 Choe et al.
(Continued)

FOREIGN PATENT DOCUMENTS

EP 3324332 A1 * 5/2018 .......... B60W 30/095
EP 3495223 A1 * 6/2019 .......... B60W 30/095

OTHER PUBLICATIONS

Niraj et al., "Pedestrian Trajectory Prediction Using RNN Encoder-Decoder with Spatio-Temporal Attentions," 2019, Publisher: IEEE.*
(Continued)

*Primary Examiner* — Tuan C To
(74) *Attorney, Agent, or Firm* — Lee & Hayes, P.C.

(57) ABSTRACT
Techniques are described herein for training contrastive models including object trajectory encoders and text encoders for evaluating, classifying, and/or predicting the movements and behaviors of dynamic objects in driving environments. A training system may receive sets of ground truth trajectory data describing movements of objects within driving environments, and associated text descriptions related to the trajectory data. The training system may jointly train the trajectory encoder and the text encoder, using contrastive loss, based on the related sets of trajectory data and text data. Once trained, the trajectory encoder and/or the text encoder may operate as pre-trained models for subsequently training and executing additional models with different output heads and/or various other downstream encoding tasks. In some examples, contrastive pre-trained trajectory encoders trained as described herein may be used for training and executing motion forecasting models within autonomous vehicles.

5 Claims, 8 Drawing Sheets

(56) References Cited

U.S. PATENT DOCUMENTS

| | | | |
|---|---|---|---|
| 2023/0359780 A1 | 11/2023 | Bouillon et al. | |
| 2024/0239359 A1* | 7/2024 | Frtunikj | G06V 20/56 |
| 2024/0359705 A1* | 10/2024 | Zhang | B60W 40/02 |
| 2024/0416962 A1* | 12/2024 | Terechko | B60W 50/0205 |
| 2025/0124788 A1 | 4/2025 | Liu et al. | |
| 2025/0148757 A1 | 5/2025 | Su et al. | |
| 2025/0153709 A1 | 5/2025 | Wu | |
| 2025/0191378 A1 | 6/2025 | Enderich | |
| 2025/0200245 A1 | 6/2025 | Cao et al. | |
| 2025/0245516 A1 | 7/2025 | Tao et al. | |

OTHER PUBLICATIONS

Office Action for U.S. Appl. No. 18/676,753, Dated Nov. 13, 2025, 25 pages.

* cited by examiner

TRAJECTORY
DATA 202

TEXT
DATA 204

"Car waiting for vehicles to pass through intersection before turning left."

212

TRAJECTORY
DATA 214

TEXT
DATA 216

"Car accelerates to merge in front of bus."

700

CONTRASTIVE TRAINING OF OBJECT TRAJECTORY ENCODERS AND TEXT ENCODERS

BACKGROUND

Autonomous and semi-autonomous vehicles may utilize systems and components to traverse through driving environments including various dynamic objects, such as other moving or stationary vehicles (autonomous or otherwise), pedestrians, bicycles, and animals, as well as static objects such as curbs, sidewalks, road debris, and other potential road obstructions. When traversing through such an environment, the vehicle may determine a trajectory based on sensor data from the perception systems of the vehicle, as well as map data of the environment. For example, a planning component within an autonomous or semi-autonomous vehicle may determine a trajectory and a corresponding set of actions for the vehicle to take to navigate in an operating environment. Trajectory selection techniques may be determined based in part on avoiding the other objects present in the environment, which may include predicting and/or anticipating the movements or behaviors of the other objects. For example, a planning system may determine an action to yield to a walking pedestrian, change lanes to avoid another vehicle in the road, etc. The perception systems of the vehicle may utilize sensor data to perceive the environment, which enables the prediction and planning systems to determine and evaluate potential actions for the vehicle to perform based on the current driving environment. However, in certain circumstances, the complexity of such environments may preclude accurate prediction of the future states and trajectories of other objects in the environment and/or efficient determinations of optimized trajectories for the vehicle, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an example architecture of a contrastive training system for training a trajectory-text model including a trajectory encoder and a text encoder, in accordance with one or more examples of the disclosure.

DETAILED DESCRIPTION

Figure 2A:
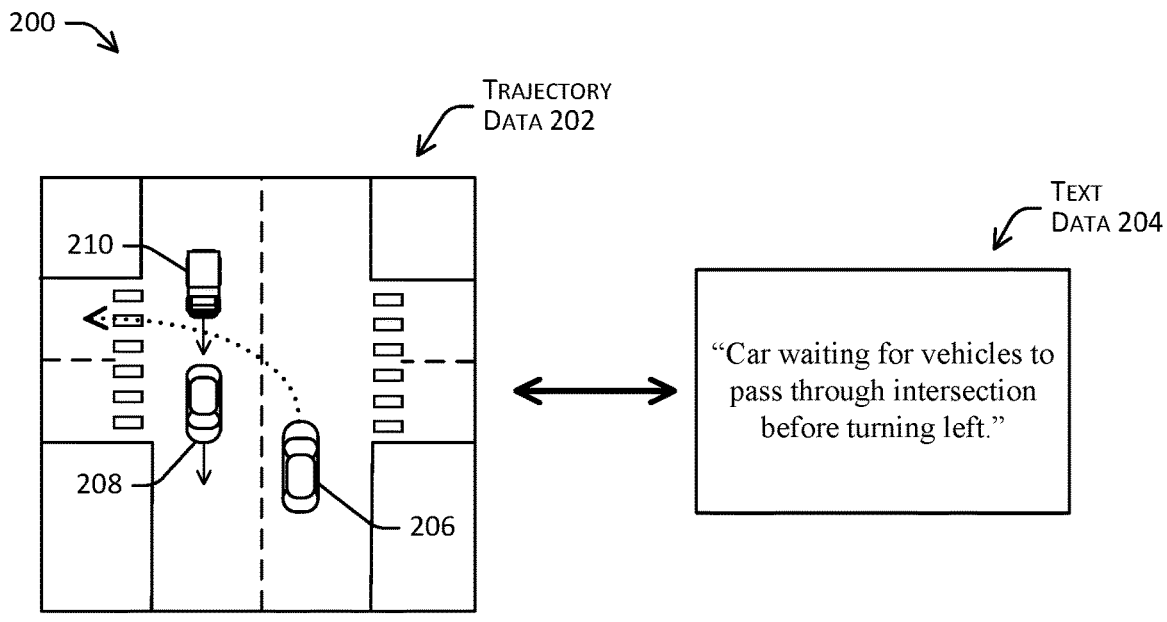
FIGS. 2A and 2B depicts examples of object trajectory data and associated text description data, in accordance with one or more examples of the disclosure.

This application describes techniques for training contrastive trajectory-text models based on multimodal object trajectory data and associated text descriptions, during which a trajectory encoder and a text encoder may be jointly trained using contrastive loss. The trajectory encoders and text encoders trained as described herein then may be used for evaluating, classifying, and/or predicting the movements and behaviors of dynamic objects (or agents) such as vehicles, bicycles, and pedestrians in driving environments. In various examples, a contrastive training system may receive sets of ground truth trajectory data describing an object's movements within a driving environment, and associated text descriptions corresponding to the trajectory data. The contrastive training system may jointly train a model including a trajectory encoder and a text encoder, during which contrastive losses are determined by comparing the encodings from related and unrelated sets of trajectory data and text descriptions. After training a trajectory encoder and/or a text encoder using the contrastive training techniques described herein, one or both of the encoders may operate as pre-trained models for use in subsequent training stages for different model output heads and/or various other downstream encoding tasks. For example, a pre-trained trajectory encoder may be used for training and executing motion forecasting models within autonomous vehicles, which may be used to predict object movements and trajectories and to determine trajectories for the autonomous vehicle to traverse the driving environment.

The contrastive models described in various examples herein may be trained using self-supervised training techniques, based on multimodal data including pairs (or larger sets) of object trajectory data and associated text caption data. During the training of a contrastive model, a training system (e.g., a trajectory-text pre-training system) may receive sets of object trajectories and corresponding text captions describing the object trajectories. The object trajectory data may include data indicating the movement of an object within a driving environment, such as a sequence of object positions/states (e.g., waypoints) over a period of time and/or the path the object took through the environment. The object trajectory data also may include data related to the driving environment itself, including the map data and data representing various other objects in the driving scene (e.g., vehicles, bicycles, and pedestrians, as well as static objects). As a result, when the object trajectory data for a particular object in the training data is encoded, the trajectory encoding may represent the movements and behaviors of the object over a period of time, not merely in isolation, but also in relation to the driving environment and the other static and dynamic objects in the driving environment at the time.

The text data used to train the contrastive model may include various types of text captions and/or descriptions corresponding to the object trajectory training data. For instance, a multimodal pair of trajectory-text training data may include object trajectory data (e.g., an object path within a driving scene) and an associated text description relating to the position, movement, and/or other attributes of the object within the driving scene. The text descriptions used as training data may include descriptions of the position and/or state of the object itself (e.g., speed, heading, yaw, use of signal lights, etc.), descriptions of the object relative to various road features (e.g., lane positioning, distance from or relative angle to intersections, curbs, sidewalks, crosswalks, etc.), and/or descriptions of the object relative to other objects in the environment (e.g., relative positions, velocities, following distances, merging or yielding behaviors, etc.). As described below in more detail, the training data may include one-to-one, one-to-many, or many-to-one relationships between object trajectory data and the associated text description data. For example, it may be advantageous when training the contrastive model to use multiple diverse sources of text description data, including programmatically generated text captions, human-labeled text descriptions, and/or text captions derived from other data sources or techniques.

During the training of the contrastive model, the training system may encode the object trajectory data using a trajectory encoder, encode the text description data using a text encoder, and compare various pairs of trajectory encodings and text encodings. Based on the comparison, the training system may determine contrastive losses for jointly training the trajectory encoder and the text encoder. For example, when the training system compares a trajectory encoding to the corresponding text encoding (e.g., the text description associated with the object trajectory), the training system may determine contrastive loss values for training the encoders to increase the similarity of the encodings. In contrast, when the training system compares a trajectory encoding to an unrelated text encoding (e.g., a different text description not associated with the object trajectory), the training system may determine contrastive loss values for training the encoders to increase the dissimilarity of the encodings.

After the contrastive model has been trained, the trajectory encoder and/or the text encoder trained via the contrastive training can be used as pre-trained models for training and executing additional models. For example, the contrastive-trained trajectory encoder may be used as a pre-trained object encoder for one or more motion forecasting models executing in autonomous vehicles. In various other examples, trajectory encoders and/or text encoders trained using contrastive loss can be used as pre-trained encoders for performing various other downstream tasks relating to object trajectory generation, classification, and/or prediction. For instance, a contrastive pre-trained trajectory encoder may be used to generate agent tokens for diffusion guidance in generative models for synthetic driving scenes. Contrastive pre-trained trajectory encoders and text encoders also may be used in systems for classifying agents and/or driving scenes into natural language classifications, and for retrieving agents and/or driving scenes based on natural language queries.

In some examples, a trajectory encoder and a text encoder that are jointly trained in a contrastive model can be subsequently used together in a separate machine-learned (ML) model or downstream system (e.g., for classifying and/or retrieving objects or driving scenes). However, in other examples, a contrastive-trained trajectory encoder may be used in a downstream model or other system that does not include or use the text encoder in any way. Similarly, a contrastive-trained text encoder may be used in a downstream model or other system that does not include or use the trajectory encoder in any way. As described below in more detail, the contrastive training using multimodal trajectory and text data may train the trajectory encoder to generate encodings that better reflect the overall meaning and context of the object trajectory. After the contrastive training of the trajectory encoder, the encodings it generates may embody the additional meaning and context associated with the object trajectory, which can improve the performance of any number of downstream models/systems, even when the downstream models/systems do not include or use the text encoder in any way.

Trajectory encoders and text encoders, when trained using the contrastive training techniques described herein, can provide technical advantages and improvements within various machine-learned (ML) models or other downstream systems. In particular, any ML model or system that generates or receives trajectory encodings or text encoders representing moving objects in a driving environment potentially can be improved by using the contrastive-trained trajectory encoders and/or text encoders described herein.

For example, various existing autonomous vehicle systems may use motion forecasting models (which also may be referred to as prediction models) to predict the future trajectories, paths, and intended destinations of the other agents in a driving environment. Certain such prediction models may use image encoders (e.g., implemented as convolutional neural networks (CNNs), transformers, etc.), configured to output image embeddings of a driving environment. The prediction models in these examples may be trained from scratch with ground truth trajectory data (e.g., unimodal trajectory data), and using a loss minimization function (e.g., an L2 loss function) or similar techniques to train the prediction model to minimize the trajectory prediction error.

Existing prediction models such as these, using trained-from-scratch image encoders, may be effective in detecting the relevant features in driving environments that have a high correlation with predicting object trajectories. However, while such models may be effective at short-term trajectory prediction (e.g., within 1-2 seconds), they tend to be much less so for longer-term trajectory prediction (e.g., 6-8 seconds or longer). Additionally, such models are often less effective at recognizing relevant but low-frequency features or aspects within a driving environment. As a result, these models may be less accurate in predicting trajectories in driving environments that include low-frequency objects (e.g., emergency vehicles, odd-sized or unusual vehicle types, construction zones, road debris, unusual road configurations, etc.) and/or low-frequency object trajectories (e.g., illegal or atypical driving maneuvers, erratic movement of pedestrians, skateboarders, children, or animals, etc.). However, because many such low-frequency objects or object trajectories also represent high-risk driving situations with potential accident and passenger safety risks, it is important for prediction models to make accurate object trajectory predictions in these situations. Existing training systems have attempted to improve prediction models using trained-from-scratch image encoders by artificially manipulating the model training process to up-sample rare driving situations or objects within the ground truth data. However, these up-sampling processes can be manually intensive, error-prone, and may further degrade the performance of the model in other relatively down-sampled driving situations.

Therefore, to address the various deficiencies of ML-trained object trajectory prediction models, the techniques herein relate to contrastive training of a trajectory encoder (e.g., instead of an image encoder) based on multimodal trajectory-text data. The trajectory encoder may be configured to receive an object's current state and recent history within the driving environment, as well as the driving scene context (e.g., map data and other object data), and may output a trajectory encoding (e.g., as a feature vector) for some or all of the dynamic objects in the environment. The trajectory encoding for an object thus may represent the object's current state, its recent history, as well as how that object relates to and interacts with the other objects and/or road features in the driving environment.

By contrastive training a trajectory encoder (and a jointly-trained text encoder), using sets of object trajectory data and corresponding text descriptions, the techniques herein may provide performance improvements in trajectory prediction models. These improvements may be observed in all driving environments, but may be especially noticeable in low-frequency driving situations that might not be recognized as relevant or trained sufficiently by existing trained-from-scratch image encoder models. As described herein, the trajectory encoder may be contrastively trained using multimodal data (e.g., with associated text captions), rather than training based solely on binary labels and/or L2 loss functions on trajectory accuracy. Contrastive training using trajectory data and associated text captions may provide a way to focus the trajectory encoder on different aspects of the scene that might not be recognized as relevant in other training systems. As described below, training the trajectory encoder with a diversity of text caption data (e.g., text descriptions from different sources, different perspectives, etc.) also may train the encoder to better understand the overall meaning and context of an object trajectory, including focusing the encoder on different aspects of the driving scene that a loss function on trajectory output might not prioritize.

Additionally, contrastive training of the trajectory encoder and/or text encoder provides advantages in the interpretability and the configurability of the trained encoders. For example, the text captions used to train the contrastive model may come from various text sources (e.g., programmatic or human-labeled), and may describe the behavior of the object in the driving scene from different perspectives (e.g., close range or farther away, etc.) and/or different timeframes (e.g., short-term versus long-term object intent, etc.). By selecting and using diverse sets of text captions, the trajectory encoder can be trained to recognize and encode relevant aspects of the driving scene, even when those aspects are rare or low-frequency. To encourage the trajectory encoder to focus more on these relevant aspects, the training system can select specific sets of text captions and/or modify the text caption training data (e.g., programmatically) to emphasize the desired aspects of the driving scene. Using these contrastive training techniques, the trajectory encoder can be trained to recognize and encode fuller trajectory encodings that reflect the meaning and intent of the objects in the driving scene, along with relevant aspects that may be overlooked by other (e.g., non-contrastive) training systems.

The contrastive training techniques described herein also may improve the interpretability of the trained model, in comparison to prediction models trained based on unimodal data. For example, when a trained-from-scratch prediction model consistently fails to make accurate predictions in certain situations, the opacity of the model can make it difficult to diagnose or correct the inaccuracies. However, when a trajectory encoder is trained within a contrastive model as described herein, any inaccuracies in the model that are detected can be diagnosed quickly and repaired using the corresponding trained text encoder. As an example, the training system can identify an inaccurate trajectory encoding (e.g., an encoding that fails to encode certain relevant features/aspects of the object trajectory or driving scene) and then use the text encoder to compare the inaccurate trajectory encoding to various text encodings. The various text encodings may be based on natural language descriptions of different relevant features/aspects within the driving scene, and the similarity between the inaccurate trajectory encoding and the various text encodings can be used to determine which aspects of the driving scene the trajectory encoder is failing to encode.

Certain examples herein discuss the advantages of using contrastive-trained trajectory encoders (and/or contrastive-trained text encoders) for improving the performance of ML trajectory prediction models. However, the use of trajectory encoders and/or text encoders trained using contrastive training as described herein can provide similar or identical improvements for various other ML models or other downstream computing systems. In some examples, trajectory encoders and/or text encoders trained contrastively based on multimodal data (e.g., object trajectories and associated text captions) can be used as pre-trained models upon which various additional models can be trained and/or downstream systems can be built. As described above, because the contrastive-trained trajectory and text encoders may better recognize and encode the meaning and purpose of an object trajectory within the driving scene, these encodings may reflect a fuller understanding of the object's intent and its potential interactions with the other objects and with the driving scene as a whole. Thus, any model or system that generates or uses object trajectory encodings, or text encodings representing descriptions of object trajectories within driving scenes, may potentially benefit from the relevant data recognized and encoded by the contrastive-trained encoders described herein. Examples of additional models or systems that may use contrastive-trained trajectory and/or text encoders may include, but are not limited to, generative ML models used to generate synthetic driving scenes (e.g., using trajectory encodings as agent tokens for diffusion guidance), as well as classification and retrieval systems for objects, object trajectories, and/or driving scenes.

The techniques described herein may be implemented in a number of ways. Example implementations are provided below with reference to the following figures. Although discussed in the context of prediction models for use on autonomous vehicles, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

Figure 1:
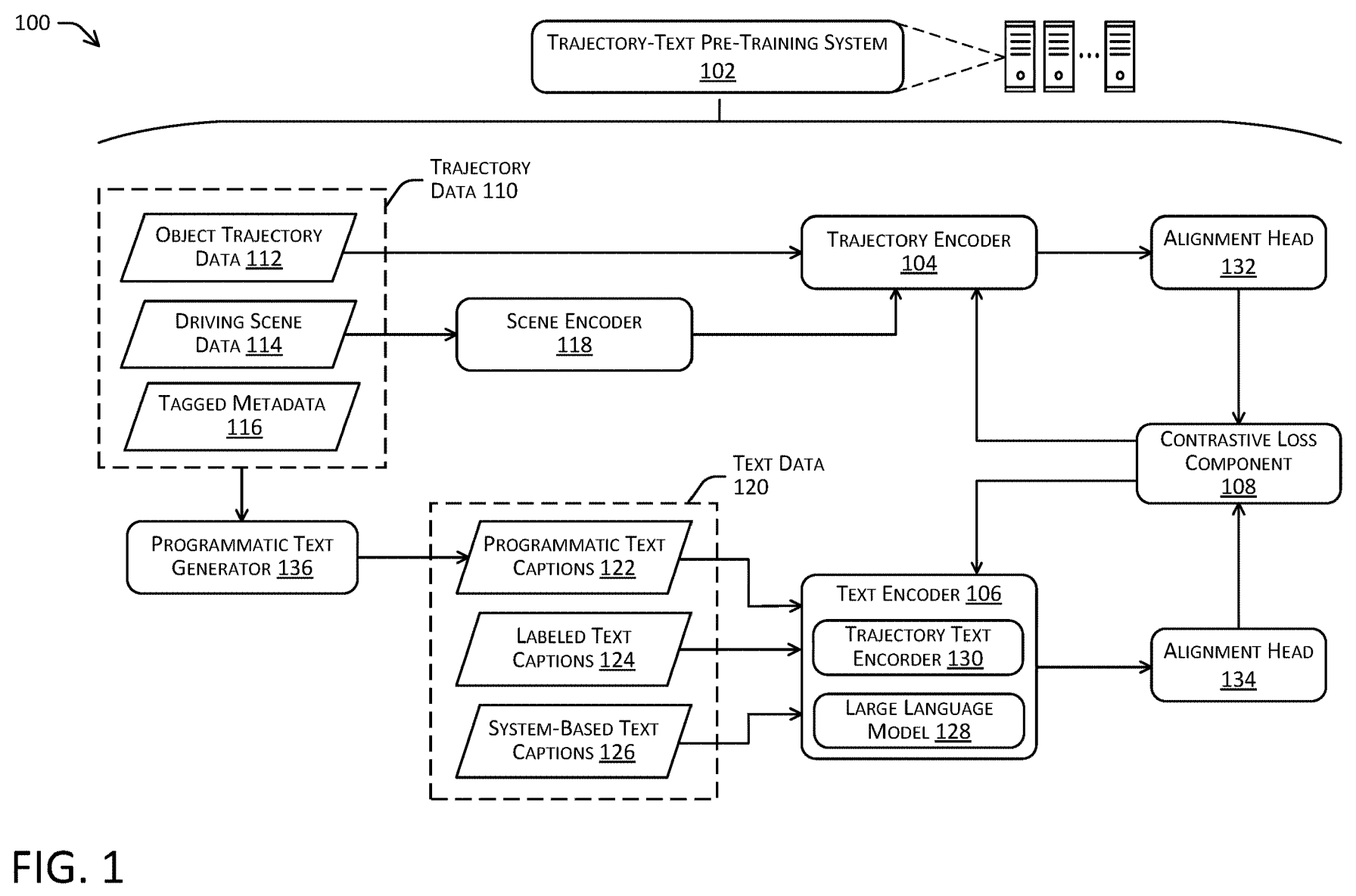

FIG. 1 depicts an example computing architecture 100 for a training system 102 (e.g., a trajectory-text pre-training system) configured to train a multimodal trajectory-text model using contrastive training techniques. As shown in this example, the contrastive model includes a trajectory encoder 104 configured to generate trajectory encodings based on object trajectory data, and a text encoder 106 configured to generate text encodings based on text data. A contrastive loss component 108 may compare (and/or analyze) the encodings generated by the trajectory encoder 104 and the text encoder 106, and determine contrastive loss values to jointly train both encoders during the training process.

As described above, the training system 102 may train the trajectory encoder 104 and the text encoder 106 jointly, based on multimodal ground truth data including sets of object trajectories and associated text captions. The trajectory data 110 received by the training system 102 may include object trajectory data 112, driving scene data 114, and/or tagged metadata 116 associated with the object trajectory or driving scene.

The object trajectory data 112 may include data representing a path (e.g., a route, path, or trajectory) taken by an object over a period of time in a driving environment. For example, for a vehicle, the object trajectory data 112 may correspond to any driving path or driving trajectory that the vehicle used to navigate along a route from an initial location toward a destination within the environment. Driving paths and/or driving trajectories may correspond to a route including a starting position (e.g., a start state) and an end position (e.g., an end state), through which the vehicle may traverse.

In some examples, a "path" may refer to a sequence of spatial (e.g., geometric) states, in which each spatial state corresponds to a point or position in the path, and each spatial state includes a combination of geometric data such as an x-position, y-position, yaw, and/or steering angle, etc. In contrast, in such examples, a "trajectory" may refer to a sequence of spatiotemporal states rather than geometric states. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc.

Similarly, in various examples described herein, trajectories and/or driving paths may be determined as sequences of positions (or points), or as sequences of states. As used in such examples, a "position" (or "point") may refer to a geometric (or spatial) state including position data (e.g., x-position, y-position, yaw, steering angle, etc.). In contrast, in such examples, a "state" may refer to a combination of a geometric state and/or a temporal state, which may include x-position, y-position, yaw, yaw rate, steering angle, steering angle rate, velocity, and/or acceleration, etc. In practice, a vehicle may be controlled to implement numerous trajectories and/or driving paths, and to pass through numerous individual points, positions, and/or states while navigating along the route from the starting position (e.g., start state) to the end position (e.g., end state).

The points and/or states within a driving path or trajectory may include various state data relating to the position, orientation, and movement of a vehicle through the environment (e.g., x-position, y-position, yaw, yaw rate, steering angle, steering angle rate, velocity, and/or acceleration, etc.). Additionally, the points and/or states of a driving path or trajectory can include further state data, such as which vehicle indicator lights are on at each position/state (e.g., brake lights, tail lights, turn signal indicators, etc.), which windows of the vehicle are rolled up or down at each position/state, whether the vehicle's windshield wipers are on or off at each position/state, whether any of the vehicle's doors (or trunk, hood, etc.) are open at each position/state, and so on.

Although the above examples refer to driving paths and/or driving trajectories for vehicles within a driving environment, the object trajectory data 112 may include similar or identical paths and/or trajectories for other types of dynamic objects. For instance, any object trajectory data 112 (and associated text caption data) may be associated with a pedestrian, bicycle, animal, or other dynamic object.

In addition to the object trajectory data 112 associated with an object, the trajectory encoder 104 also may receive and encode various data representing the driving scene in which the object is moving/operating. In this example, the driving scene data 114 may include a representation of the driving environment of the object (e.g., a top-down multi-channel image representation), including the map data of the environment, road features and/or any other static or dynamic objects in the driving environment. A scene encoder 118 may be configured to generate scene encodings representing driving environments, based at least in part on the driving scene data 114 (e.g., map data and/or perception/log data captured of the driving environment) associated with the object trajectory data 112. In some examples, the scene encoder 118 may generate a scene encoding (or a scene embedding) as a feature vector that is unique to the particular driving scene/scenario. The scene encoding may represent the driving environment at one or more particular times within the log data, corresponding to the time period of the object trajectory data 112.

In some examples, the scene encoder 118 may use a neural network architecture that is trained to output scene encodings based on inputs including a combination of map data and data perceived by a vehicle (e.g., log data) in the environment. For instance, the scene encoder 118 may receive as input driving scene data 114, including a representation of the driving environment at a specific time (e.g., map data and/or a road network), perceived road and traffic signal data at the specific time (e.g., traffic light states, road permissibility, etc.), proximate agent data for static and/or dynamic agents in the environment at the specific time, and encoded vehicle state data including the intended destination of the vehicle at the specific time. A neural network within the scene encoder 118 may transform the input data into a scene encoding, which may be represented as a multidimensional vector within a driving scene embedding space. Additional examples of various techniques for determining scene encodings and/or other representations of an environment can be found, for example, in U.S. Patent Application Ser. No. 17,855,088, filed Jun. 30, 2022, and entitled, "Machine-Learned Component For Vehicle Trajectory Generation," the entire contents of which are incorporated herein by reference in their entirety for all purposes.

As shown in this example, the trajectory encoder 104 may receive the object trajectory data 112 and a scene encoding from the scene encoder 118. Based on these inputs, the trajectory encoder 104 may be configured to output a trajectory encoding (or embedding), for example, as a feature vector. As noted above, each trajectory encoding may be object-centric (e.g., representing a single object within the driving environment). However, the trajectory encoder 104 may use an ML transformer architecture or other neural network with attention, and thus may recognize and encode various types of relative information into the trajectory encoding for an object, such as attention/interactions between the object and other objects or map/road features in the environment. After generating a trajectory encoding associated with an object, the trajectory encoder 104 may provide the trajectory encoding to an alignment head 132 to provide explicit alignment and/or normalize the trajectory encoding, after which the trajectory encoding may be provided to the contrastive loss component 108.

The text encoder 106 within the training system 102 may operate in conjunction with and/or parallel to the trajectory encoder 104. As described above, the text encoder 106 may text encodings based on text data 120 containing various text descriptions associated with the trajectory data 110 for an object. For example, the text data 120 may include one or more text captions describing a particular driving scene and the movements/behaviors of the object within the driving scene. As with the trajectory data 110, the text data 120 may be object-centric (e.g., describing a single object within the driving environment). However, the text captions within the text data 120 may describe the movements or actions of the object itself (e.g., speeds, orientations, yaws, maneuvers performed, etc.), and/or may describe the movements or actions of the object in relation to various other objects or road features in the driving environment (e.g., (e.g., relative positions, angles, velocities, following distances, merging or yielding behaviors, etc.).

As noted above, training the contrastive model using a diversity of text caption data can improve the capabilities of the trajectory encoder 104 to better recognize and encode the meaning and intent of an object trajectory within the context of the driving scene as a whole. One aspect of text data diversity may be the source from which the text data 120 is generated and/or received. In this example, the text data 120 used to train the contrastive model includes three different types/categories of text caption data: programmatic text captions 122, labeled text captions 124, and system-based text captions 126.

The programmatic text captions 122 may include various procedurally generated text data based on the trajectory data 110 associated with an object in a driving environment. As shown in this example, the training system 102 may use a programmatic text generator 136 configured to automatically generate text captions describing the trajectory of an object, individually and/or relative to the object's driving environment. The programmatic text generator 136 may be implemented with heuristics and/or trained ML models, and may be configured in to receive various combinations of object trajectory data, such as a set of object trajectory data 112, driving scene data 114, and/or tagged metadata 116, and to automatically generate one or more natural language text captions describing the movements/behaviors of the object. Examples of the programmatic text captions 122 may include text statements regarding the object's velocity, orientation, acceleration, steering rate, driving lane, lane position, vehicle indicator lights, distances from various road features (e.g., intersections, exits, crosswalks, driveways, medians, etc.), and/or distances from static objects or other dynamic objects in the environment.

Labeled text captions 124 may include various human-labeled or other manually generated text descriptions associated with an object in a driving environment. In some examples, the training system may provide a user interface configured to display log data captured by a vehicle (e.g., object trajectory data 112 and driving scene data 114) into a visual display, and to receive a manual (e.g., typed or audio) description of the object's movements or behavior from a user. Labeled text captions 124 can include descriptions of any of the aspects of the driving trajectory or scene described above for programmatic text captions 122, such as text descriptions of the object's current position or state, the object's position or state relative to various road features, and/or the object's position or state relative to other objects in the environment. In some cases, the labeled text captions 124 also may convey additional information describing the intent of an agent (e.g., an agent planning or attempting to perform a maneuver or follow a driving path), the driving styles of a vehicle (e.g., a distracted driving, an aggressive driver, etc.), and/or the nature of interactions between multiple objects/agents.

System-based text captions 126, as used herein, may refer to various additional types of text data that may be received from other data sources. In some examples, system-based text captions 126 may include text from natural language-based systems for generating driving scenarios. In such systems, a user may provide a text description of a driving simulation to be generated, and a synthetic driving scenario generator may generate and run a simulation using the synthetic scenario. In these cases, the text description provided by the user may be a system-based text caption 126, and the synthetic driving scenario may be used as the trajectory data 110. In other examples, system-based text captions 126 may include text notes (e.g., written or spoken) from a vehicle operator and/or a remote teleoperator of an autonomous vehicle.

The various text captions within the text data 120, like the trajectory data 110, may be object-centric in that they may be associated with a particular object in the driving environment. However, the text data 120 may include diverse types of descriptions relating to the object within the context of the driving scene. The various sources of the text data 120 described herein may support different types of text caption diversity, all of which may improve the contrastive training of the trajectory encoder and text encoder to better recognize and encode relevant aspects of the driving environment.

For example, different text captions within the text data 120 may be diverse with respect to their use of language, vocabulary, and grammatical style. As an example, a diverse set of text captions may include synonymous or closely-related terms (e.g., "slow down," "brake," "decelerate," and "begin to stop") in various text captions so that the encoders can be trained to understand the different terminology relating to object trajectories/maneuvers, and the nuances distinguishing them.

Additionally, different text captions within the text data 120 may be diverse with respect to their perspective in the driving environment. For instance, certain text captions may describe the driving scene from the perspective of the objects, and other text captions may describe the driving scene from an overhead view, etc.

As another example, different text captions within the text data 120 may be diverse with respect to their distance from the associated object. For example, certain text captions may describe an object's trajectory or behavior relative to the road features or other objects very close to the object in the environment (e.g., "the vehicle is driving 10 feet behind another car in the same lane"). In contrast, other text captions may describe an object's trajectory or behavior relative to the driving environment as viewed from farther away (e.g., "the vehicle is stuck in a large traffic jam on the highway").

As yet another example, different text captions within the text data 120 may be diverse with respect to the length of time when they describe the object's trajectory or behavior within the driving environment. For instance, some text captions may describe an object's trajectory or behavior over a short period of time (e.g., "the pedestrian walked forward into the crosswalk"), while other text captions may describe the object's trajectory or behavior over a longer period of time (e.g., "the pedestrian crossed the street at the crosswalk and then turned right").

The various different examples of text data diversity described herein, including diversity of text caption sources, text caption generation techniques, caption length, vocabulary and grammatical styles, caption perspective, caption distance, and/or caption time period, all may provide advantages for contrastive training of the trajectory encoder 104 and the text encoder 106. As described above, the diversity in text captions may improve the capabilities of the trained models to recognize and encode relevant aspects of the object's behavior and the driving scene, even when such aspects are rare or complex within the context of the driving scene. As a result, the encodings generated with the trained encoders may better reflect the complexities of the object's behavior and the driving scene as a whole, by recognizing and capturing the meaning of an object trajectory, the intent of an agent, and the nuances of diverse interactions between objects and agents in the driving scene.

The text encoder 106 may receive text data 120 (e.g., text captions of object descriptions and/or behaviors), and may encode the text captions into text encodings (or embeddings). As noted above, each text encoding may be object-centric (e.g., describing a single object within the driving environment). However, the text encoder 106 may use an ML transformer architecture or other neural network with attention, and thus may recognize and encode various types of relative information into the text encoding for an object description, such as attention between words/phrases describing the interactions between object and other objects or map/road features in the environment. After generating a text encoding associated with object trajectory/behavior, the text encoder 106 may provide the text encoding to an alignment head 134 to provide explicit alignment and/or normalize the text encoding, after which the text encoding may be provided to the contrastive loss component 108.

The text encoder 106 may be implemented using an ML transformer or other neural network architecture. As shown in this example, the text encoder 106 may use a multi-layer transformer architecture, including a large language model (LLM) 128, and a separate trajectory text encoder 130. In this example, the LLM 128 may be implemented as a set of transformer blocks, and may be pre-trained using generalized language data (e.g., a large Internet data source), so that the pre-trained LLM 128 can effectively perform general natural language processing (NLP) tasks. The separate trajectory text encoder 130 may be implemented as additional transformer blocks configured to operate on top of the LLM 128 to perform additional NLP tasks that are specific to the movements, behaviors, and trajectories of objects within various types of driving scenes and environments.

The contrastive loss component 108 may be configured to compare trajectory encodings from the trajectory encoder 104 with text encodings from the text encoder 106. As described below in more detail, the contrastive loss component 108 may determine contrastive loss values to jointly train the trajectory encoder 104 and the text encoder 106. For instance, the contrastive loss values may be determined to increase (e.g., to a maximum positive value) the dot product of related sets of encodings (e.g., trajectory and text encodings that are associated with the same object trajectory), and to increase the dissimilarity (e.g., to a maximum negative value) the dot product of unrelated sets of encodings (e.g., trajectory and text encodings that are not associated with the same object trajectory).

In various examples, the contrastive training techniques described herein can be performed using any number of pairs (or larger sets) of object trajectory data and associated text caption data. For example, based on log data representing a single ground truth driving scene, the training system 102 may determine object trajectory data 110 and corresponding text data 120 for a single object within the driving scene, and then may train the contrastive model based on the single object using the techniques described herein. However, in other examples, it may improve the accuracy of the model and/or the compute efficiency of the model training process, to train the model based on an entire driving scene (e.g., rather than based on a single object in the driving scene). For example, for a ground truth driving scene comprising N agents (e.g., 5 agents, 10 agents, 50 agents, etc.), the training system 102 may determine object trajectory data 110 and corresponding text data 120 for each agent in the driving scene, and may use any or all of the encoding pairs (e.g., include related encoding pairs associated with the same agent and unrelated encoding pairs associated with different agents) to train the contrastive model. In these examples, training the contrastive model by sampling multiple agents (or all agents) in a driving scene may improve compute efficiency for training the model, because different agents may use the same scene encodings and/or may share the compute required to encode map information and/or the various objects in the driving scene.

When training the contrastive model by sampling multiple agents in a single driving scene, the training system 102 may be configured to identify similarities in the object trajectory data and/or text caption data for similar objects in the scene. For example, a driving scene may include a row of parked cars, a line of cars proceeding in the same lane in the same direction, or group of pedestrians walking together on a sidewalk, etc. In these examples, there may groupings of similar objects where the scene encodings, object trajectories, and/or corresponding text captions for the objects may be similar or identical. For instance, procedurally generated text captions based on an agent's attributes may be the same or similar for a grouping of pedestrians moving together, a group of parked or stopped vehicles, etc. In such examples, for any set of similar agents within a driving scene, compute efficiency can be improved when generating scene encodings, encoding map data and/or object data, and/or generating text caption data for the sets of similar agents.

In some examples, when training the contrastive model with multiple agents in a single driving scene, the training system 102 may be configured to analyze the scene to determine particular agents to dropout from the training process, so that the dropped-out agents are not used to train the contrastive model. For instance, when the driving scene includes a large group of similarly situated agents (e.g., a large group of pedestrians moving together, a large number of cars parked along a road or in a parking lot, etc.), then the training system 102 may determine that only a subset of the agents in the group should be used for training the contrastive model. For instance, based on the numbers of agents in a group of similar agents, and the degree of similarity between the group of agents (e.g., similar positions, object types, trajectories, physical/behavioral attributes, etc.), the training system 102 may determine that training the model based on all agents in the group may be compute inefficient and may yield diminishing returns with respect to accurately training the model. Instead, the training system 102 may determine a smaller representative subset of the agents in the group of similar agents to use for training the contrastive model. For the selected subset of the agents, the training system 102 may determine trajectory data 110 and text data 120 for the agents, and may use this data to train the contrastive model as described herein. For any dropped-out agents in the driving scene, the training system 102 need not determine trajectory data 110 or text data 120 corresponding to the agent, and the model need not be trained based on the dropped-out agent.

In some cases, when a driving scene has as few as two similar agents, the training system 102 may dropout one of the similar agents or may other modified the training of the contrastive model to account for the agent similarity. As described herein, a contrastive model may generally be trained to determine a loss value that will increase the dissimilarity between a trajectory encoding for a first object and a text caption for a different second object. However, in instances when the first object and the second object are very similar objects in a driving scene (e.g., two adjacent parked cars, two pedestrians walking together, etc.), the trajectory data and/or the text caption data for the two objects may be similar or identical. In these instances, because of the similarity of the first and second objects, it may be counterproductive to train the model to increase dissimilarity between the trajectory encodings and text encodings of the first and second objects. Therefore, in some examples, the training system 102 may dropout either the first object or the second object. Additionally or alternatively, the training system 102 might not dropout the first object or second object, but may be configured not to perform the training iterations where the model is trained to increase dissimilarity between the first object's trajectory encoding and the second object's text encoding, or to increase dissimilarity between the second object's trajectory encoding and first object's text encoding.

Figure 2B:
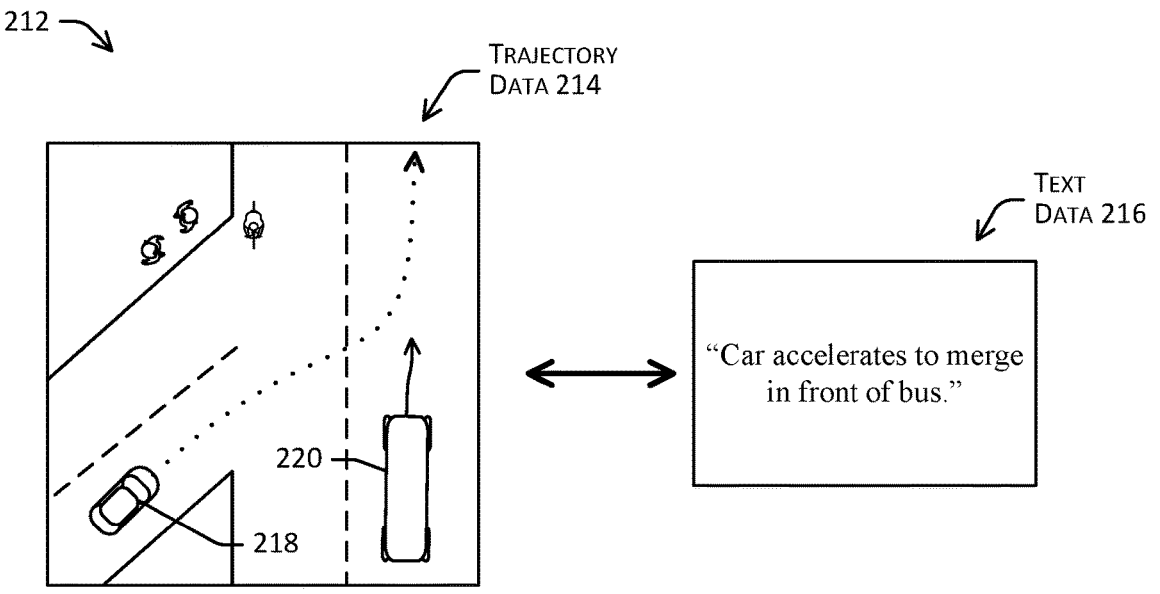

FIGS. 2A and 2B show two examples depicting object trajectories within driving scenes, including associated text data describing the driving scene. In FIG. 2A, example 200 includes trajectory data 202 depicting a representation of a driving trajectory of a vehicle 206 within a driving scene, and corresponding text data 204 describing the vehicle's trajectory within the scene. In this example, the trajectory data 202 depicts the vehicle 206 making a left turn at an intersection, after first allowing two oncoming cars (vehicles 208 and 210) to proceed through the intersection. The corresponding text data 204 states "Car waiting for vehicles to pass through intersection before turning left." In FIG. 2B, the second example 212 includes trajectory data 214 depicting a representation of a driving trajectory of a vehicle 218 within a second driving scene, and corresponding text data 216 describing the vehicle's trajectory within the second scene. In this example, the trajectory data 214 depicts the vehicle 218 proceeding quickly through an angled junction onto a northbound street in front of a bus 220. The corresponding text data 216 states "Car accelerates to merge in front of bus."

In both of these examples, the pairs of trajectory data and corresponding text data are generated from the same ground truth driving data (e.g., vehicle log data), including data representing the movements and/or behaviors of at least one object over a period of time in a driving environment. For example, the trajectory data 202 and trajectory data 214 and may correspond to object trajectory data 112 and driving scene data 114, derived from a portion of a vehicle log (and the corresponding map data) that captures a driving scene and various objects over a period of time. The corresponding text data 204 and text data 216 may represent text captions generated using any of the text caption sources described herein. For instance, text data 204 and/or text data 216 may be programmatic text captions, labeled text captions, and/or system-based text captions.

As described in more detail, for related pairs of trajectory data and text data, the contrastive loss component 108 may train the encoders jointly to output similar encodings. That is, the trajectory encoder 104 and text encoder 106 may be jointly trained to output a trajectory encoding based on trajectory data 202 that is similar to the text encoding output based on text data 204. Similarly, the encoders may be trained so that the trajectory encoding of trajectory data 214 is similar to the text encoding of text data 216. However, the encoders also may be trained so that the trajectory encoding of trajectory data 202 is not similar to the text encoding of text data 216, and that the trajectory encoding of trajectory data 214 is not similar to the text encoding of text data 204.

Figure 3:
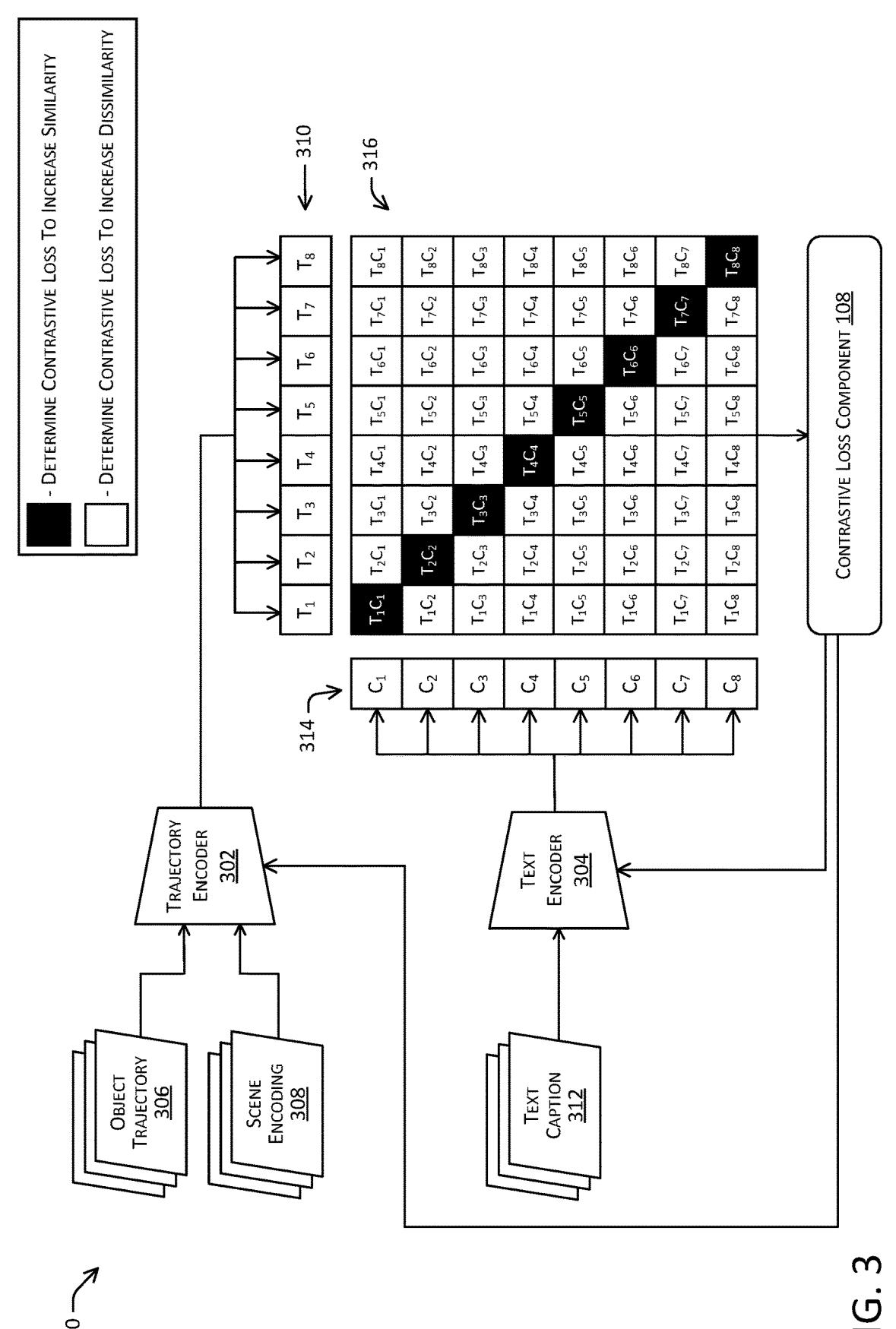
FIG. 3 is a diagram illustrating an example contrastive training technique for jointly training a trajectory encoder and a text encoder, in accordance with one or more examples of the disclosure.

FIG. 3 shows an example diagram 300 depicting a technique for training a contrastive model including a trajectory encoder 302 and text encoder 304. As shown in this example, the contrastive model can be trained using pairs of related ground truth training data: trajectory data and corresponding text description data. During the training process, the training system 102 may train the trajectory encoder 302 and text encoder 304 jointly using the contrastive loss component 108.

In this example, the trajectory encoder 302 may be similar or identical to the trajectory encoder 104 described above, and the text encoder 304 may be similar or identical to the text encoder 106. To train the contrastive model, the training system 102 may provide the trajectory encoder 302 with a set of trajectory training data, which may include the set of object trajectories 306 and corresponding scene encodings 308. The trajectory encoder 302 may generate a trajectory encoding (e.g., a feature vector) associated with each object trajectory 306, based on an object trajectory 306 and its corresponding scene encoding 308. The output of the trajectory encoder 302 includes a trajectory encoding array 310, including an encoding for each of the object trajectories 306.

Additionally, the training system 102 may provide the text encoder 304 with a set of text training data (e.g., text captions 312), in which each text caption 312 is paired with and describes one of the object trajectories 306. The text encoder 304 may generate a text encoding (e.g., a feature vector) based on each text caption 312. The output of the text encoder 304 includes a text encoding array 314, including an encoding for each of the text captions 312.

The contrastive loss component 108 in this example may be configured to jointly train the trajectory encoder 302 and the text encoder 304, by comparing the pairs of trajectory encodings and text encodings with the encoding matrix 316. Based on each encoding-encoding comparison, the contrastive loss component 108 may determine contrastive loss values and modify (e.g., via backpropagation) one or both of the trajectory encoder 302 and the text encoder 304. For example, the contrastive loss component 108 may compare each of the paired sets of trajectory encodings and related text encodings (shown as black squares in the encoding matrix 316), and may determine contrastive loss values for the trajectory encoder 302 and/or the text encoder 304 to train the encoders to generate more similar encodings for these pairs. In contrast, the contrastive loss component 108 may compare each of the unpaired sets of trajectory encodings and unrelated text encodings (shown as white squares in the encoding matrix 316), and may determine contrastive loss values for the trajectory encoder 302 and/or the text encoder 304 to train the encoders to generate less similar encodings for these pairs.

In various examples, the contrastive loss component 108 may determine a single loss value that may be applied via backpropagation to both the trajectory encoder 302 and the text encoder 304, or may determine different loss values to apply to the different encoders. In some instances, the contrastive loss component 108 may train only one of the encoders in response to an encoding-encoding comparison, or may alternatively train the encoders, etc.

Figure 4A:
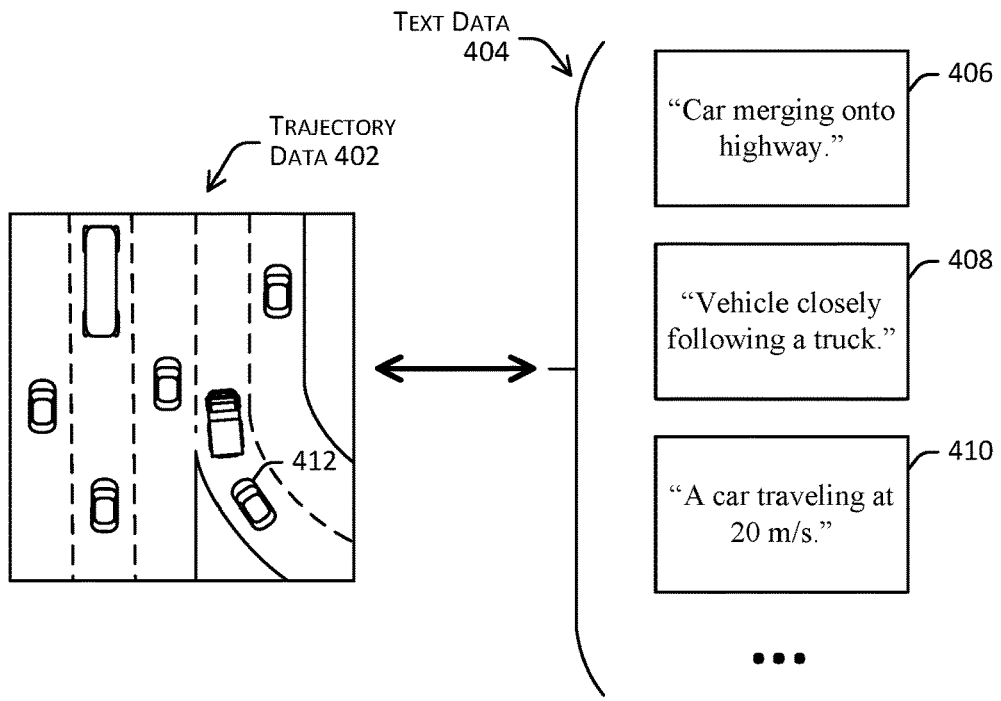
FIGS. 4A-4C depict additional examples of a contrastive training technique for jointly training a trajectory encoder and a text encoder, based on many-to-one object trajectory data and associated text description data, in accordance with one or more examples of the disclosure.
Figure 4B:
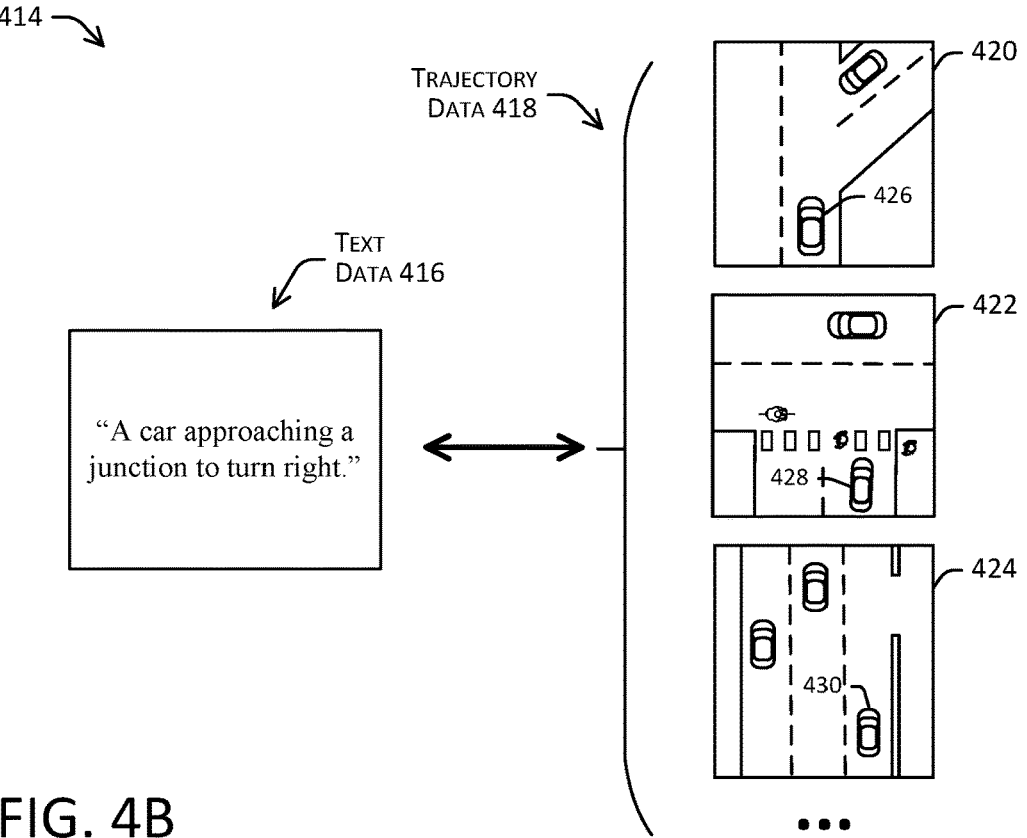
Figure 4C:
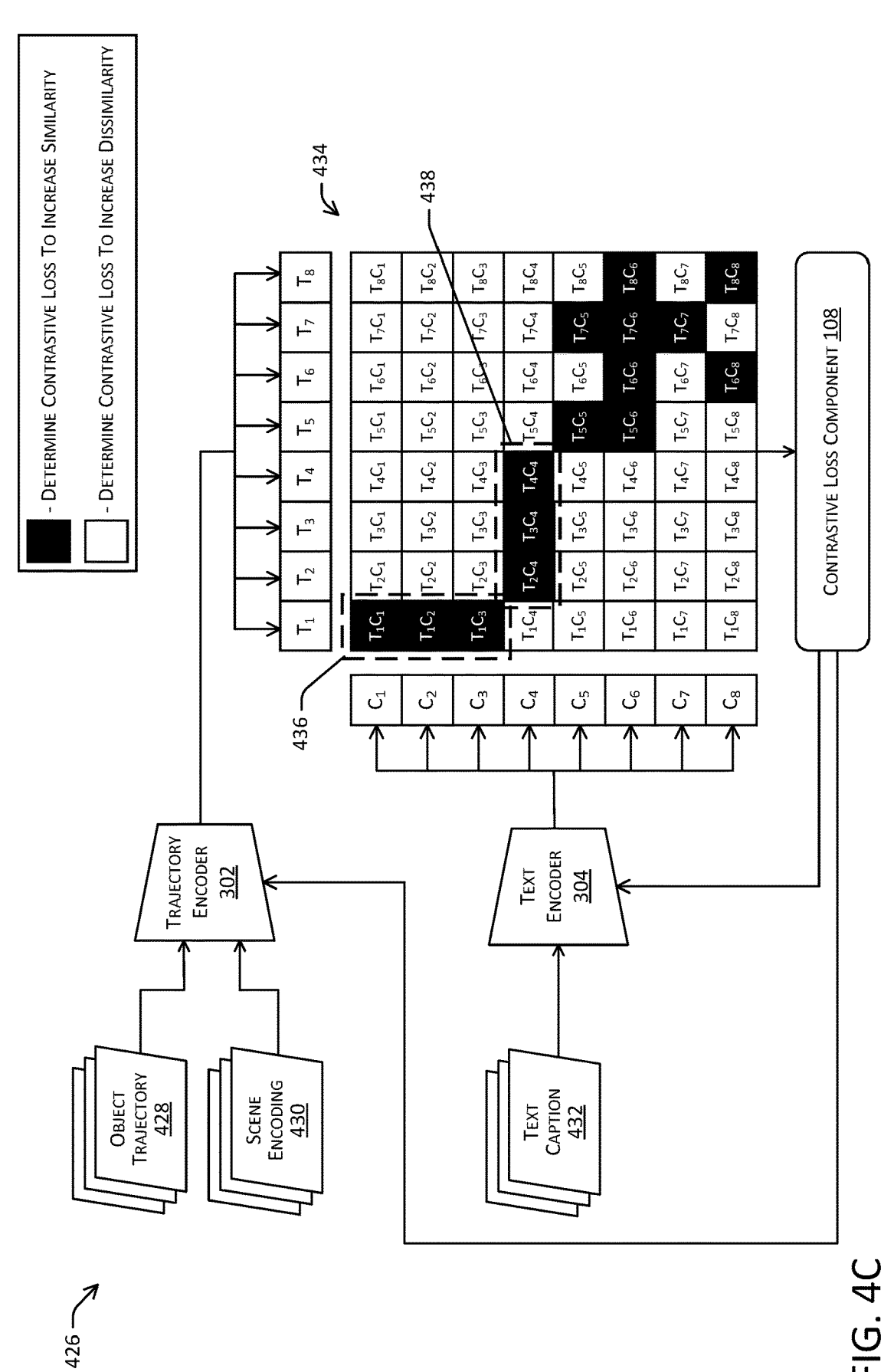

FIGS. 4A-4C depict additional examples of a contrastive training technique for jointly training a trajectory encoder and a text encoder, based on many-to-one object trajectory data and/or many-to-one text description data. FIGS. 4A and 4B show two additional examples depicting object trajectories within driving scenes, along with associated text data. In the above example, the training system 102 was described as training the contrastive model using one-to-one pairs of object trajectory data and corresponding text captions. However, in other examples, the contrastive model may be trained using one-to-many or many-to-one relationships between groups of object trajectory data and associated text descriptions.

In FIG. 4A, example 400 includes a single trajectory data 402 depicting a representation of a number of vehicles in driving scene, and text data 404 that includes multiple different text captions 406-410 describing the trajectory of a vehicle 412 within the ground truth driving scene. In this example, three different text captions 406-410 are shown, each of which accurately describes certain aspects of the movement and/or behavior of the vehicle 412 within the trajectory data 402. For example, text caption 406 describes vehicle 412 as "Car merging onto highway." Text caption 408 describes vehicle 412 as "Vehicle closely following a truck." Text caption 408 describes vehicle 412 as "A car traveling at 20 m/s."

In some examples, the different text captions 406-410 may represent text captions generated using different text caption techniques or data sources (e.g., a programmatic text caption, a labeled text caption, and a system-based text captions). Additionally or alternatively, any number of other text caption types and/or techniques could be used to generate unique and accurate text captions describing the trajectory data 402 (e.g., different text caption generation techniques, caption lengths, styles, perspectives, distances, time periods, etc.). In these various examples, the different text captions used by the training system 102 may further encourage the trajectory encoder 302 to recognize and encode unique and relevant aspects of the movement/behavior of the vehicle 412 and/or the driving scene.

Similarly, in FIG. 4B example 414 includes a single text caption 416 with corresponding trajectory data 418 depicting three different driving scenes 420-424. In this example, the text caption 416 states, "A car approaching a junction to turn right." Each of the driving scenes 420-424 includes a unique driving environment with an agent that accurately corresponds to the text caption 416. For instance, in the driving scene 420 the vehicle 426 is approaching an angled junction intending to turn right. In the driving scene 422, the vehicle 428 stopped at a crosswalk waiting to turn right. In the driving scene 424, the vehicle 430 is preparing to turn right into a parking lot. As described in the previous examples, the different driving scene and trajectory data used by the training system 102 in this example may further encourage the trajectory encoder 302 and/or the text encoder 394 to recognize and encode unique and relevant aspects of the movement/behavior of the vehicle and/or the driving scene.

FIG. 4C shows an example diagram 426, similar to the diagram in FIG. 3, depicting a technique for training a contrastive model including a trajectory encoder 302 and text encoder 304. However, the example in FIG. 3 depicted training a contrastive model using one-to-one pairs of related ground truth trajectory data and corresponding text descriptions. In contrast, in this example, the trajectory encoder 302 and the text encoder 304 may be jointly trained using one-to-many and/or many-to-one relationships between groups of object trajectory data and associated text descriptions. For instance, using sets of ground truth training data such as those shown in FIG. 4A (e.g., multiple text captions associated with a single object trajectory) and FIG. 4B (e.g., multiple object trajectories associated with a single text caption), the training system 102 may train the trajectory encoder 302 and text encoder 304 jointly using the contrastive loss component 108.

In this example, the trajectory encoder 302 may be similar or identical to the trajectory encoder 104 described above, and the text encoder 304 may be similar or identical to the text encoder 106. As in the previous example, to train the contrastive model, the training system 102 may provide the trajectory encoder 302 with a set of trajectory training data, which may include the set of object trajectories 428 and corresponding scene encodings 430. The trajectory encoder 302 may generate a trajectory encoding (e.g., a feature vector) associated with each object trajectory 428, based on an object trajectory 428 and its corresponding scene encoding 430. The output of the trajectory encoder 302 includes a trajectory encoding array (e.g., $T_1$ to $T_8$), including an encoding for each of the object trajectories 428.

Additionally, the training system 102 may provide the text encoder 304 with a set of text training data (e.g., text captions 432). The text encoder 304 may generate a text encoding (e.g., a feature vector) based on each text caption 432. The output of the text encoder 304 includes a text encoding array (e.g., $C_1$ to $C_8$), including an encoding for each of the text captions 432. As noted above, unlike the previous example, each text caption 432 may be paired with and may describe one or multiple of the object trajectories 428. Similarly, each object trajectory 428 may be paired with and may describe one or multiple of the text captions 432.

The contrastive loss component 108 may jointly train the trajectory encoder 302 and the text encoder 304, by comparing each pair trajectory encoding-text encoding pair with the encoding matrix 434. Based on each encoding-encoding comparison, the contrastive loss component 108 may determine contrastive loss values and modify (e.g., via backpropagation) one or both of the trajectory encoder 302 and the text encoder 304. As shown in this example, a single trajectory encoding may have multiple paired text encodings, and/or a single text encoding may have multiple paired trajectory encodings. For instance, the grouping 436 of blackened encoding-encoding pairs may represent encodings based on example 400, and the grouping 438 of blackened encoding-encoding pairs may represent encodings based on example 414.

As in the previous example, the contrastive loss component 108 may compare each of the paired sets of trajectory encodings and related text encodings (shown as black squares in the encoding matrix 434), and may determine contrastive loss values for the trajectory encoder 302 and/or the text encoder 304 to train the encoders to generate more similar encodings for these pairs. In contrast, the contrastive loss component 108 may compare each of the unpaired sets of trajectory encodings and unrelated text encodings (shown as white squares in the encoding matrix 434), and may determine contrastive loss values for the trajectory encoder 302 and/or the text encoder 304 to train the encoders to generate less similar encodings for these pairs.

As noted above, the contrastive loss component 108 may determine a single loss value that may be applied via backpropagation to both the trajectory encoder 302 and the text encoder 304. For instance, the contrastive loss component 108 may compute a single scalar loss term that is backpropagated to both the trajectory encoder 302 and the text encoder 304. The contrastive loss component 108 may be configured to compute scalar loss terms that will maximize (e.g., a maximum positive value) the dot product of related pairs of encodings (e.g., the black squares) while computing scalar loss terms that will minimize (e.g., a maximum negative value) the dot product of unrelated pairs of encodings (e.g., the white squares). In these examples, even when the contrastive loss component 108 determines a loss term for an encoding pair, the gradients backpropagated to the neural networks within the trajectory encoder 302 and the text encoder 304 may be different due to the different weights and activations within the neural networks. In other cases, the contrastive loss component 108 may determine different loss values to apply to the different encoders. In some instances, the contrastive loss component 108 may train only one of the encoders in response to an encoding-encoding comparison, or may alternatively train the encoders, etc.

Figure 5:
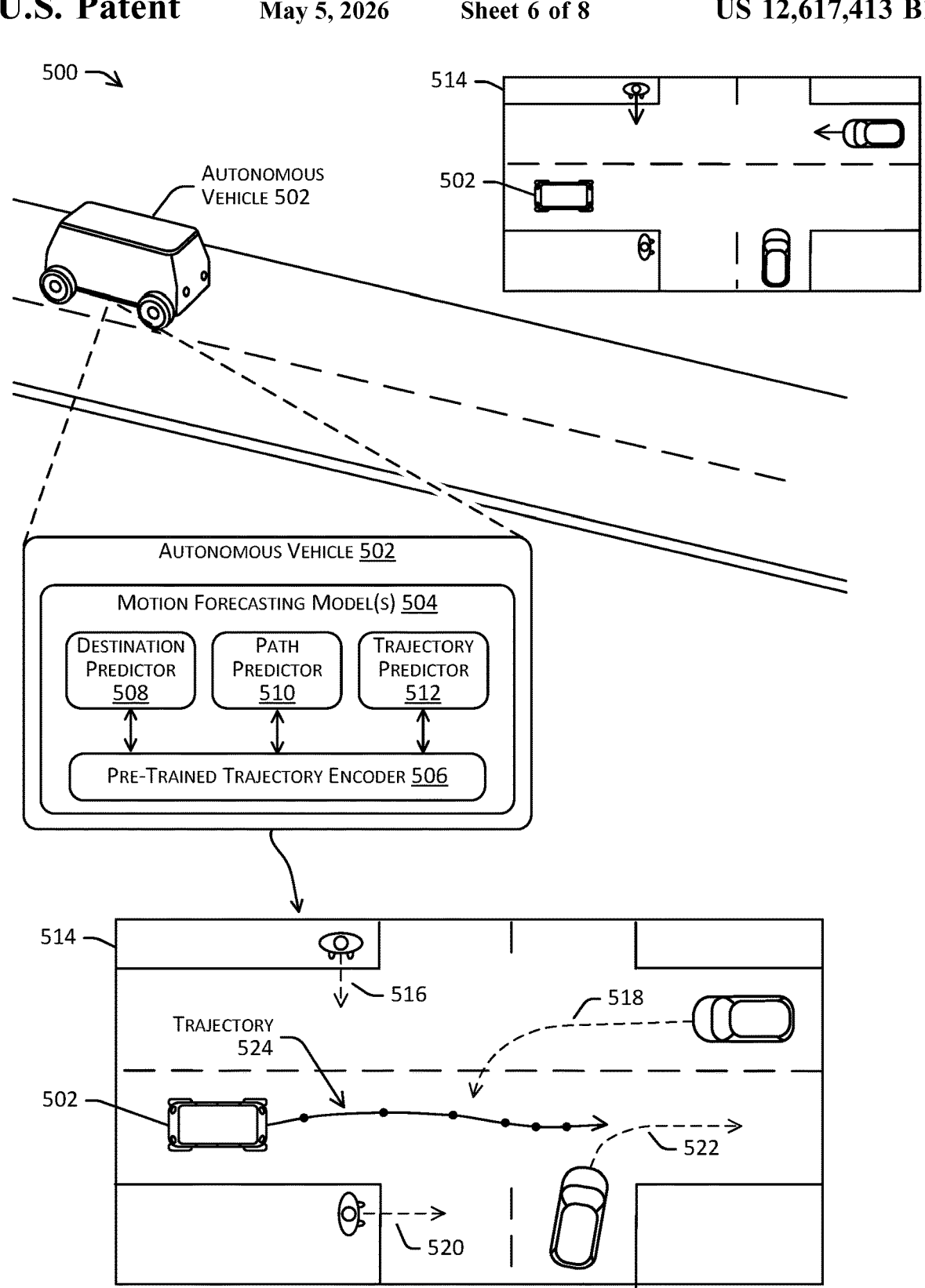
FIG. 5 illustrates an autonomous vehicle including motion forecasting models using a pre-trained trajectory encoder, in which the autonomous vehicle uses the motion forecasting models to predict object trajectories and determine a determined trajectory to control the autonomous vehicle along a route in a driving environment.

FIG. 5 illustrates an example scenario 500 including an autonomous vehicle 502 configured to execute various motion forecasting model(s) 504 (e.g., prediction models) using a pre-trained trajectory encoder 506. The pre-trained trajectory encoder 506 may be similar or identical to the trajectory encoder 104 and/or the trajectory encoder 302, and may be pre-trained within a contrastive model (e.g., jointly with a text encoder) as described herein. As discussed above, a trajectory encoder trained using the contrastive training techniques herein may provide technical improvements and advantages when used as a pre-trained trajectory encoder 506 for training and executing motion forecasting model(s) 504. In this example, the autonomous vehicle 502 may include a set of motion forecasting models 504 including a destination prediction model 508, a path prediction model 510, and a trajectory prediction model 512. Although each of these models relates generally to trajectory prediction, they may be trained with different output heads to perform different prediction tasks. These models may be used, individually or in combination, on the autonomous vehicle 502 to analyze perceived driving environments, predict future object/agent states and behaviors, and determine an optimal trajectory for the autonomous vehicle to follow to traverse the environment.

In this example, the technical advantages associated with using the pre-trained trajectory encoder 506 on the autonomous vehicle 502 may include improved performance of each of the motion forecasting model(s) 504. As discussed above, the pre-trained trajectory encoder 506, trained using the contrastive training techniques herein, can more effectively recognize and encode relevant aspects of the object's behaviors (e.g., intent indicators, driving styles, etc.) and of the driving scene as a whole (e.g., characterizations of agent-agent interactions, etc.). Therefore, using the pre-trained trajectory encoder 506 as the underlying model for the separately trained output heads of the motion forecasting model(s) 504 may (axiomatically) improve the predictive performance of any subsequent motion forecasting model(s) 504 built on top of the pre-trained trajectory encoder 506.

In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

Although only three motion forecasting model(s) 508-512 are depicted in this example, the autonomous vehicle 502 may comprise computing device(s) that may include any number of ML models within various perception components, prediction components, and/or planning components. For instance, a planning component of the autonomous vehicle 502 may include trajectory optimization components configured to perform stochastic optimization and/or other optimization techniques to determine an optimal path for the autonomous vehicle 502 to traverse a driving environment. The planning component also may include, or may invoke, one or more prediction components (e.g., the motion forecasting model(s) 504). The motion forecasting model(s) 504 and/or the planning component may comprise the hardware and/or software for conducting the operations discussed herein related to object trajectory prediction, and vehicle trajectory determination and navigation.

In some examples, the various vehicle navigation systems and functionalities described herein may comprise processor-executable instructions stored in a memory of the autonomous vehicle 502 and/or accessible thereto, hardware, and/or some combination thereof (e.g., a field-programmable gate array (FPGA), application-specific integrated circuit (ASIC)).

In this example, the autonomous vehicle 502 may be driving within a driving environment 514, which is depicted as a driving scene at a particular time and particular location. Prior to determining a trajectory to follow, the autonomous vehicle 502 may receive and/or determine a route including a start state (e.g., the current state of the autonomous vehicle 502) and an end state representing the location, velocity, and/or pose, etc., that the autonomous vehicle 502 intends to achieve. A planning component on the autonomous vehicle 502 may determine a route based at least in part on sensor data, map data, and/or based on an intended destination of a mission (e.g., received from a passenger, from a command center, etc.). As noted above, references to a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the autonomous vehicle 502 operates within the environment 514, it may receive map data of the environment (e.g., from a local or remote map system), and perception data (e.g., sensor data) from a perception component of the autonomous vehicle 502. The map data may include, for example, road data determined based on a map of the driving environment 514 and/or localizing the autonomous vehicle 502 within the environment. For instance, the map data may include data associated with any number of road segments (e.g., lane segments) in the driving environment 514, such as the location (e.g., boundaries), size (e.g., length and width), and shape (e.g., curvature) of the road segment, as well as additional attributes of the road segment such as directionality, speed limit, gradient, road surface, etc.

The autonomous vehicle 502 also may receive sensor data from sensor(s) of the autonomous vehicle 502 (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc. A perception component of the autonomous vehicle 502 may include one or more ML models and/or other computer-executable instructions for detecting, identifying, segmenting, classifying, and/or tracking objects from sensor data collected from the environment of the autonomous vehicle 502. For example, data generated by a perception component may be used by the autonomous vehicle 502 to localize its position within the driving environment relative to the map data. In some instances, a perception component also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

As discussed in the examples herein, the motion forecasting model(s) 504 may use the map data and/or perception data, and apply trajectory prediction techniques to determine predicted destinations, predicted paths, and/or predicted trajectories for any other objects in the proximate environment of the autonomous vehicle 502. In this example, as the autonomous vehicle 502 traverses the driving environment 514, the pre-trained trajectory encoder 506 may receive current state data and recent history data for the various objects in the driving environment 514, as well as the driving scene context (e.g., map data and other object data), and may output a trajectory encoding (e.g., as a feature vector) for each of the dynamic objects perceived in the driving environment 514. Based on the trajectory encodings generated by the pre-trained trajectory encoder 506, the destination prediction model 508, path prediction model 510, and/or trajectory prediction model 512 may execute their respective output heads to perform their separate prediction tasks for the other dynamic objects in the driving environment. As shown in this example, one or more of the motion forecasting model(s) 504 may use the trajectory encodings from the pre-trained trajectory encoder 506 to determine predicted trajectories 516-522 for various objects in the driving environment 514. Then, based on the predicted trajectories 516-522, along with the current state data, map data, and its intended destination, a planning component of the autonomous vehicle 502 may determine and execute a vehicle trajectory 524.

In some examples, the autonomous vehicle 502 may determine the trajectory 524 as an improved or optimal trajectory from a baseline trajectory, using stochastic optimization (and/or optimization algorithms), that takes into account the future predicted driving scene(s) of the environment 514, including the predicted trajectories of the autonomous vehicle 502 and the predicted trajectories and states of other agents or objects in the driving environment 514. In some cases, the trajectory 524 may represent an optimal and/or lowest-cost trajectory determined by the autonomous vehicle 502, after evaluating a number of kino-dynamically feasible trajectories that the autonomous vehicle 502 may perform, based on safety costs (e.g., potential interactions with objects/agents), passenger comfort costs, route progress costs, etc. Additionally, although the autonomous vehicle 502 has determined a single trajectory 524 in this example, in other examples a planning component of the autonomous vehicle 502 may determine any number of alternative low-cost trajectories using the techniques described herein (e.g., relying on the underlying pre-trained trajectory encoder 506).

Figure 6:
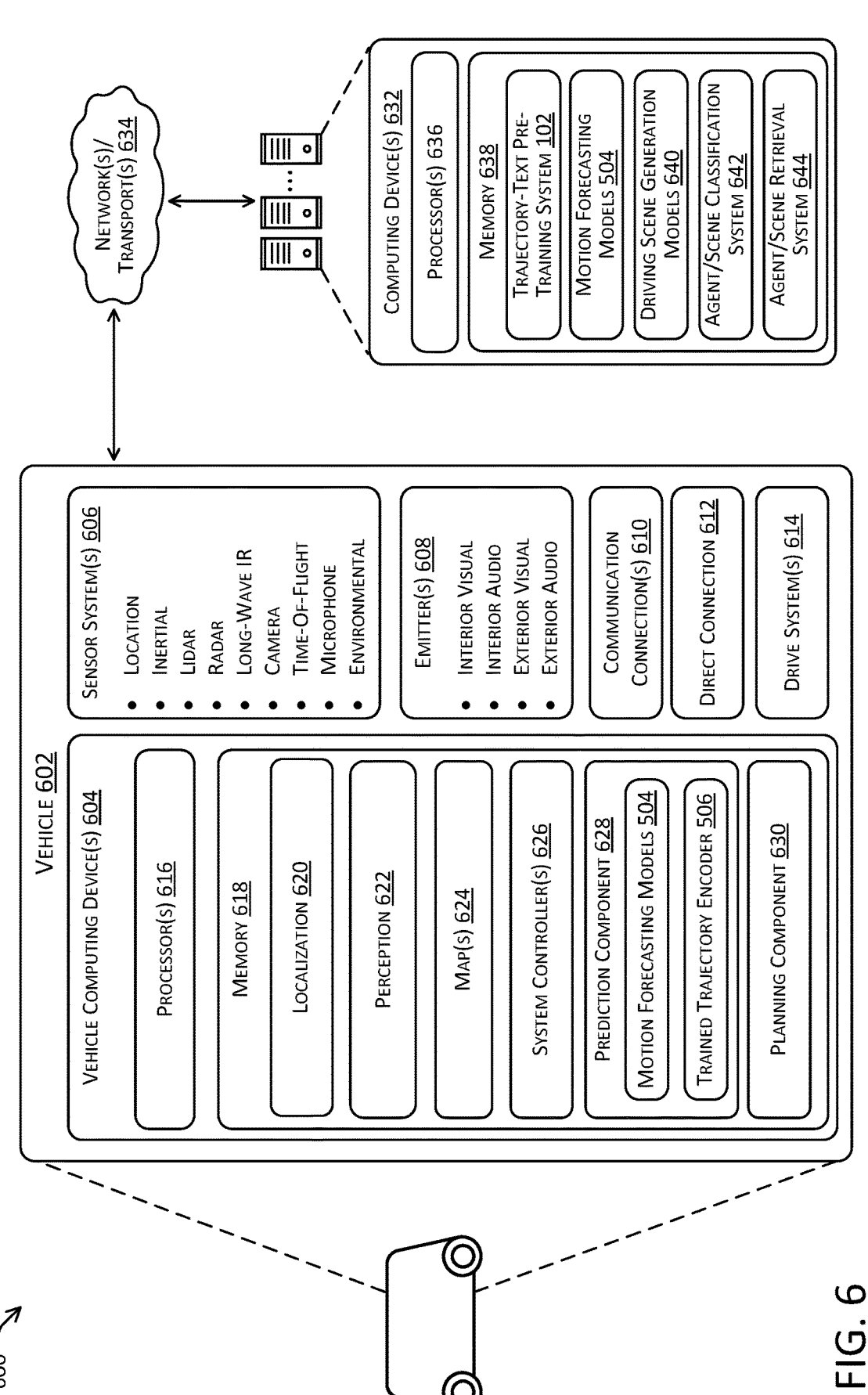
FIG. 6 depicts a block diagram of an example system for implementing various techniques described herein.

FIG. 6 illustrates an example computing environment 600 that may be used to implement the techniques described herein for training a contrastive trajectory-text ML model including a trajectory encoder and a text encoder, as well as various techniques for using the trained encoders in various downstream models and systems. In this example, the computing environment 600 includes a vehicle 602 and computing device(s) 632 configured to train a contrastive trajectory-text ML model using contrastive loss, and use the trained trajectory encoder in on-vehicle motion forecasting models and/or various other downstream systems. The vehicle 602 may include various software-based and/or hardware-based components of an autonomous vehicle, and may be used to control autonomous vehicles traversing through physical environments and/or simulated vehicles operating in driving simulations. The vehicle 602 may be similar or identical to any or all of the real and/or simulated vehicles or vehicle controllers described herein. The computing device(s) 632 may be similar or identical to the computing devices of the training system 102 and/or its various related components and systems described above in reference to FIGS. 1-5. In some examples, the vehicle 602 may correspond to a vehicle traversing a physical environment, capturing and storing log data which may be provided to the computing device(s) 632 and used to train contrastive models as described herein. Additionally or alternatively, the vehicle 602 may receive and execute motion forecast models 504 and/or related models from the computing device(s) 732. Further, the vehicle 602 may be an autonomous vehicle operating in a real-world driving environment, or a simulated vehicle operating in a simulated driving environment.

In at least one example, the vehicle 602 may correspond to an autonomous or semi-autonomous vehicle configured to perform object perception and prediction functionality, route planning and/or optimization. The example vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 may include vehicle computing device(s) 604, sensor(s) 606, emitter(s) 608, communication connection(s) 610, at least one direct connection 612 (e.g., for physically coupling with the vehicle to exchange data and/or to provide power), and one or more drive system(s) 614. In this example, the vehicle 602 may correspond to the autonomous vehicle 502 discussed above. The computing environment 600 may additionally or alternatively comprise vehicle computing device(s) 604.

In some instances, the sensor(s) 606 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 632.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 602 may also include communication connection(s) 610 (e.g., network interface(s)) that enable communication between the vehicle 602 and one or more other local or remote computing device(s). For instance, the communication connection(s) 610 may facilitate communication with other local computing device(s) on the vehicle 602 and/or the drive systems(s) 614. Also, the communication connection(s) 610 may additionally or alternatively allow the vehicle to communicate with other nearby computing device(s) (e.g., other nearby vehicles, traffic signals, etc.). The communication connection(s) 610 may additionally or alternatively enable the vehicle 602 to communicate with computing device(s) 632. In some examples, computing device(s) 632 may comprise one or more nodes of a distributed computing system (e.g., a cloud computing architecture).

The communication connection(s) 610 may include physical and/or logical interfaces for connecting the vehicle computing device(s) 604 to another computing device or a network, such as network(s) and/or transport(s) 634. For example, the communication connection(s) 610 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 604 and/or the sensor(s) 606 may send sensor data, via the network(s) and/or transport(s) 634, to the computing device(s) 632 at a particular frequency, after a lapse of a predetermined period of time, in near real-time, etc.

In some instances, the vehicle 602 may include one or more drive systems(s) 614 (or drive components). In some instances, the vehicle 602 may have a single drive system 614. In some instances, the drive system(s) 614 may include one or more sensors to detect conditions of the drive system(s) 614 and/or the surroundings of the vehicle 602. By way of example and not limitation, the sensor(s) of the drive systems(s) 614 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 614. In some cases, the sensor(s) on the drive systems(s) 614 may overlap or supplement corresponding systems of the vehicle 602 (e.g., sensor(s) 606).

The drive systems(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 614 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 614. Furthermore, the drive systems(s) 614 may also include one or more communication connection(s) that enable communication by the respective drive component with one or more other local or remote computing device(s).

The vehicle computing device(s) 604 may include processor(s) 616 and memory 618 communicatively coupled with the one or more processors 616. Computing device(s) 632 may also include processor(s) 636, and/or memory 638. As described above, the memory 638 of the computing device(s) 632 may store and execute a training system 102 for training a contrastive trajectory-text model. As shown in this example, the memory 638 of the computing device(s) 632 also may store and/or execute various systems that may use the contrastive-trained trajectory encoder and/or text encoder, such as motion forecast models 504, driving scene generation models 640, agent/scene classification systems 642, and/or agent/scene retrieval systems 644.

The processor(s) 616 and/or 636 may be any suitable processor capable of executing instructions to process data and perform operations as described herein. By way of example and not limitation, the processor(s) 616 and/or 636 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 618 and/or 638 may be examples of non-transitory computer-readable media. The memory 618 and/or 638 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and/or memory 638 may store a localization component 620, perception component 622, maps 624, system controller(s) 626, prediction component 628, and/or planning component 630.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include map(s) of an environment and can continuously determine a location, velocity, and/or orientation of the autonomous vehicle within the map(s). In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the planning component 630 and/or to the prediction component 628, a location and/or orientation of the vehicle 602 relative to the environment and/or sensor data associated therewith.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 624 may include at least one map (e.g., images and/or a mesh) generated in accordance with the techniques discussed herein. In some examples, the vehicle 602 can be controlled based at least in part on the maps 624. That is, the maps 624 can be used in connection with the localization component 620, the perception component 622, and/or the planning component 630 to determine a location of the vehicle 602, identify objects in an environment, and/or generate routes and/or trajectories to navigate within an environment.

In some instances, the perception component 622 may comprise a primary perception system and/or a prediction system implemented in hardware and/or software. The perception component 622 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 622 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 628 may include functionality to generate predicted information associated with objects in an environment. As an example, the prediction component 628 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 602 traverses an environment. As shown in this example, the prediction component 628 may include a trained trajectory encoder 506 generated as described herein, and/or motion forecasting models 504 using the trained trajectory encoder 506 (e.g., as a pre-trained model). In various examples, the prediction component 628 can generate one or more predicted positions, predicted velocities, predicted trajectories, etc., for such target objects based on attributes of the target object and/or other objects proximate the target object.

The planning component 630 may receive a location and/or orientation of the vehicle 602 from the localization component 620, perception data from the perception component 622, and/or predicted trajectories from the prediction component 628, and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 626 and/or drive systems(s) 614 may parse/cause to be carried out, second instructions for the emitter(s) 608 may be formatted according to a second format associated therewith). In at least one example, the planning component 630 may comprise a nominal trajectory generation subcomponent that generates a set of candidate trajectories, and selects a trajectory for implementation by the drive systems(s) 614 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 618 and/or 638 may additionally or alternatively store a mapping system (e.g., generating a map based at least in part on sensor data), a planning system, a ride management system, etc. Although localization component 620, perception component 622, the prediction component 628, the planning component 630, and/or system controller(s) 626 are illustrated as being stored in memory 618, any of these components may include processor-executable instructions, machine-learned model(s) (e.g., a neural network), and/or hardware and all or part of any of these components may be stored on memory 638 or configured as part of computing device(s) 632.

As described herein, the localization component 620, the perception component 622, the prediction component 628, the planning component 630, and/or other components of the computing environment 600 may comprise one or more ML models. For example, the localization component 620, the perception component 622, the prediction component 628, and/or the planning component 630 may each comprise different ML model pipelines. The prediction component 628 may use a different ML model or a combination of different ML models in different circumstances. For example, the prediction component 628 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 618 may additionally or alternatively store one or more system controller(s) 626, which may be configured to control steering, propulsion, braking, safety, emitters, communication, and other systems of the vehicle 602. These system controller(s) 626 may communicate with and/or control corresponding systems of the drive systems(s) 614 and/or other components of the vehicle 602.

It should be noted that while FIG. 6 is illustrated as a distributed system, in alternative examples, components of the vehicle 602 may be associated with the computing device(s) 632 and/or components of the computing device(s) 632 may be associated with the vehicle 602. That is, the vehicle 602 may perform one or more of the functions associated with the computing device(s) 632, and vice versa.

Figure 7:
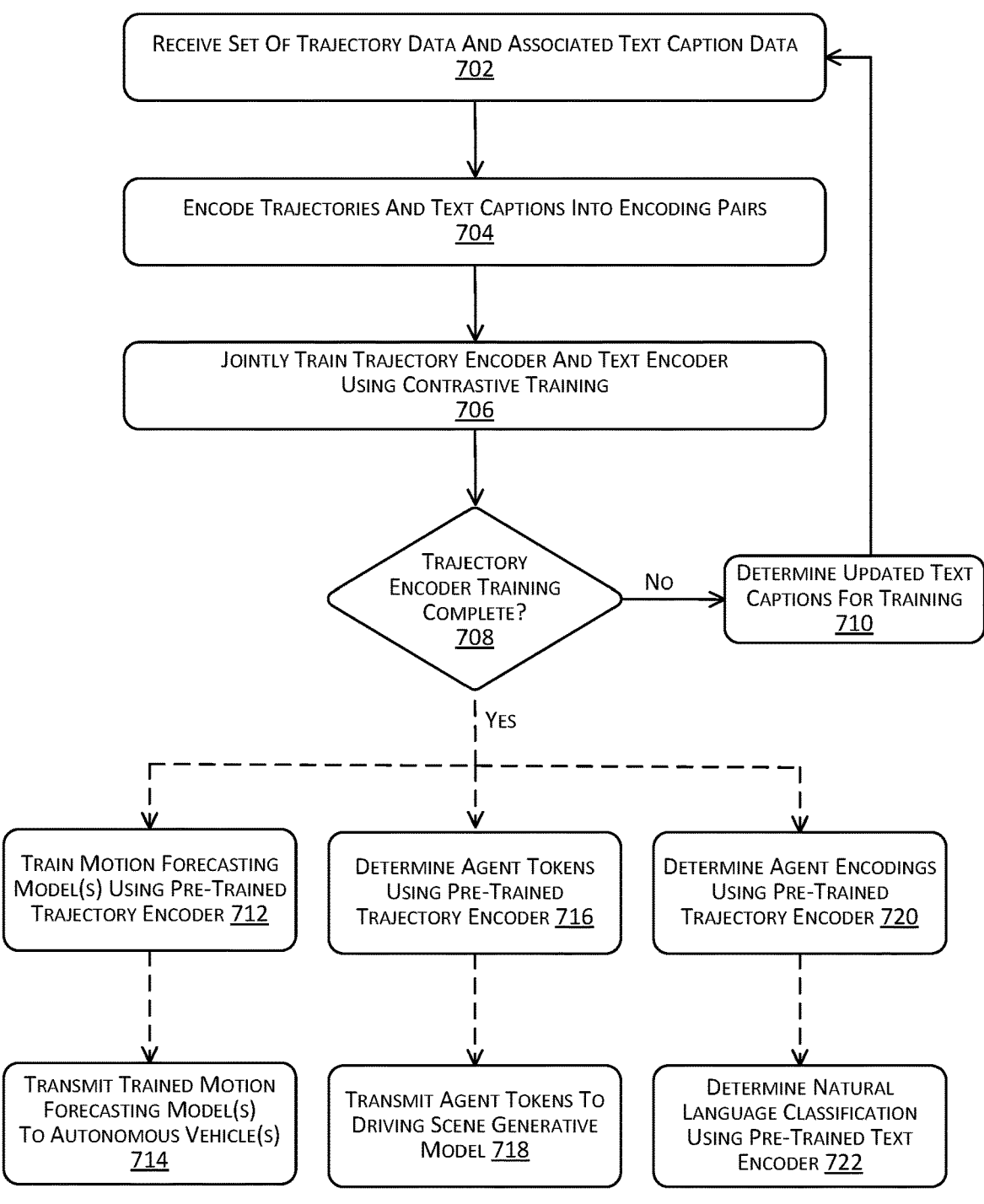
FIG. 7 is a flow diagram illustrating an example process for contrastive training of a trajectory encoder and text encoder, based on object trajectory data and associated text description data, and using the trained encoders for various downstream tasks, in accordance with one or more examples of the disclosure.

FIG. 7 is a flow diagram illustrating an example process 700 for contrastive training of a trajectory encoder and a text encoder, based on object trajectory data and associated text description data, and for using the trained encoders in various downstream models and systems. As described below, process 700 may be performed by one or more computer-based components configured to implement various functionalities described herein. For instance, process 700 may be performed by training system 102 including (or associated with) a contrastive loss component 108 configured to jointly train a trajectory encoder 104 and a text encoder 106.

Process 700 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 702, the training system 102 may receive multimodal ground truth data for training a contrastive model, including a set of trajectory data and associated text caption data. As described above, the object trajectory ground truth data may include a representation of an object's trajectory or path through a driving environment, along with various data representing the driving scene in which the object is operating. For example, the trajectory data may include a scene encoding generated based on the map data of the driving environment and object data for any additional static and/or dynamic objects in the driving environment. The ground truth text data may include one or more text captions describing the movements/behaviors the object within the driving scene. Both the trajectory data and the text data 120 may be object-centric (e.g., associated with a single object in the driving environment), but also may describe the object in relation to the various road features and/or other objects in the environment.

At operation 704, the training system 102 may encode the trajectory data and corresponding text captions into pairs of related encodings. For example, the training system 102 may use a trajectory encoder 104 to encoder the trajectory data into a trajectory encoding, and may use a separate text encoder 106 to encode the corresponding text data into a text encoding.

At operation 706, the training system 102 may train the contrastive model, including jointly training the trajectory encoder 104 and the text encoder 106 using contrastive loss techniques. As described herein, the training system 102 may include a contrastive loss component 108 configured to compare related and unrelated pairs of trajectory encodings and text encodings. In some examples, the contrastive loss component 108 may determine contrastive loss values for jointly train the trajectory encoder 104 and the text encoder 106. The contrastive loss component 108 may determine contrastive loss values to increase the similarity of related sets of encodings (e.g., trajectory and text encodings that are associated with the same object trajectory), and to increase the dissimilarity of unrelated sets of encodings (e.g., trajectory and text encodings that are not associated with the same object trajectory).

At operation 708, the training system 102 may evaluate the trajectory encoder 104 and/or the text encoder 106, to determine whether the encoders have been sufficiently trained as pre-trained underlying models for use within various downstream models or systems. As described above, after the encoders have been trained and evaluated, various additional models or downstream systems may potentially benefit from the ability of the contrastive-trained encoders to recognize and encode unique and relevant aspects of object's behavior and/or the driving environment. Examples of such models or downstream systems may include, but are not limited to, generative ML models used to generate synthetic driving scenes, agent or driving scene natural language classification models, and/or agent or driving scene natural language retrieval models.

When the training system 102 determines, based on an evaluation of the trajectory encoder 104 and/or text encoder 106, that the encoders are not sufficiently trained to recognize and encode the relevant features and aspects of the object trajectory data (708: No), then process 700 may return to operation 702 for additional training. As described above, in some examples, the training system 102 also may determine updated (e.g., new or revised) text captions for subsequent training states of the encoders.

For instance, at operation 710, the training system 102 may retrieve alternative sets of text captions from various other text sources (e.g., programmatic or human-labeled), or text captions that describe the object's trajectory/behavior in different ways, from different perspectives, over different distance ranges, during different time periods, etc. By selecting and using different sets of text captions for training in operation 710, the trajectory encoder 104 may be trained more effectively to recognize and encode relevant aspects of the driving scene, even obscure or low-frequency aspects. To encourage the trajectory encoder 104 to focus more on these relevant aspects, the training system 102 can select specific sets of text captions in operation 710 (and/or modify the text caption training data (e.g., programmatically)) to emphasize the desired aspects of a driving scene.

When the training system 102 determines that the trajectory encoder 104 and/or the text encoder 106 have been sufficiently trained for use as pre-trained underlying models (708: Yes), then the training system 102 may provide the pre-trained trajectory encoder 104 and/or pre-trained text encoder 106 to one or more downstream models/systems that may be built upon these pre-trained encoders and configured to leverage the advantages and improvements of the pre-trained encoders.

For instance, in operation 712, the training system 102 may use a pre-trained trajectory encoder to train one or more additional prediction models. In operation 714, the pre-trained trajectory encoder and trained prediction model(s) (e.g., a destination prediction model 508, a path prediction model 510, a trajectory prediction model 512, etc.) may be transmitted to an autonomous vehicle for use within its trajectory prediction and/or trajectory planning components. In other examples, in operation 716, the training system 102 may use a pre-trained trajectory encoder 104 to generate diffusion model conditioning data (e.g., agent tokens), and in operation 718 the agent tokens may be transmitted to a driving scene generative models for use as diffusion guidance when generating synthetic driving scenes. In still other examples, the training system 102 may use a pre-trained trajectory encoder 104 to determine a set of agent encodings within an agent/driving scene natural language classification system. In such examples, at operation 722, the classification system may be executed to classify the agent encodings into natural language classes that can be analyzed and queried via the system.

Example Clauses

1. A system comprising: one or more processors; and one or more non-transitory computer-readable media storing computer-executable instructions that, when executed, cause the one or more processors to perform operations comprising: receiving driving scene data associated with a driving environment; receiving an object trajectory of an object in the driving environment; receiving a text description associated with the object trajectory of the object; determining, using a trajectory encoder, and based at least in part on the driving scene data and the object trajectory, a first trajectory encoding; determining, using a text encoder, and based at least in part on the text description associated with the object trajectory, a first text encoding; and jointly training the trajectory encoder and the text encoder, wherein the jointly training comprises: determining, based at least in part on a similarity between the first trajectory encoding and the first text encoding, a first loss associated with the trajectory encoder, and a second loss associated with the text encoder; modifying the trajectory encoder, based at least in part on the first loss; and modifying the text encoder, based at least in part on the second loss.

B. The system of paragraph A, wherein the text description indicates at least one of: a relationship between the object and a second object in the driving environment; or a relationship between the object and a map data feature in the driving environment.

C. The system of paragraph A, wherein the text encoder comprises: a first set of transformer blocks associated with a large language model; and a second set of transformer blocks associated with descriptions of object movements in the driving environment, wherein jointly training the trajectory encoder and the text encoder comprises modifying the second set of transformer blocks.

D. The system of paragraph A, wherein jointly training the trajectory encoder and the text encoder comprises: training, during a first training stage, a trained trajectory encoder; and wherein the operations further comprise: training, during a second training stage after the first training stage, an object motion forecasting model including the trained trajectory encoder.

E. The system of paragraph D, the operations further comprising: transmitting the object motion forecasting model to a vehicle, wherein the vehicle is configured to be controlled based at least in part on the object motion forecasting model.

F. A method comprising: receiving input data including at least one of: trajectory data associated with a first object in an environment, or a text description associated with the first object in the environment; and determining, using a trained encoder and based at least in part on the input data, a first encoding, wherein: the trained encoder comprises a trajectory encoder and the first encoding comprises a trajectory encoding; or the trained encoder comprises a text encoder and the first encoding comprises a text encoding, wherein the trajectory encoder and the text encoder have been jointly trained, based at least in part on a similarity between a second trajectory encoding associated with a second object and a second text encoding associated with the second object.

G. The method of paragraph F, wherein jointly training the trajectory encoder and the text encoder comprises: training, during a first training stage, a trained trajectory encoder; and training, during a second training stage after the first training stage, an object motion forecasting model including the trained trajectory encoder.

H. The method of paragraph G, wherein the object motion forecasting model comprises: a first trained output head configured to predict, based at least in part on an output of the trained trajectory encoder, an intended destination of an agent in a driving environment; and a second trained output head configured to predict, based at least in part on the output of the trained trajectory encoder, a future trajectory of the agent in the driving environment.

I. The method of paragraph F, wherein the input data includes the text description, and wherein the text description indicates at least one of: a relationship between the first object and a different object in the environment; or a relationship between the first object and a map data feature in the environment.

J. The method of paragraph F, wherein jointly training the trajectory encoder and the text encoder comprises: determining, based at least in part on the similarity between the second trajectory encoding and the second text encoding, a loss value; modifying the trajectory encoder, based at least in part on the loss value; and modifying the text encoder, based at least in part on the loss value.

K. The method of paragraph F, wherein the text encoder comprises: a first set of transformer blocks associated with a large language model; and a second set of transformer blocks associated with descriptions of object movements in a driving environment, wherein jointly training the trajectory encoder and the text encoder comprises modifying the second set of transformer blocks.

L. The method of paragraph F, wherein the trajectory encoder and the text encoder have been jointly trained, based at least in part on a second trajectory encoding associated with a second object, a second text encoding associated with the second object, a third trajectory encoding associated with a third object, a third text encoding associated with the third object, and wherein jointly training the trajectory encoder and the text encoder comprises: modifying at least one of the trajectory encoder or the text encoder to cause at least one of: increasing the similarity between the second trajectory encoding and the second text encoding; increasing a similarity between the third trajectory encoding and the third text encoding; increasing a dissimilarity between the second trajectory encoding and the third text encoding; or increasing a dissimilarity between the second text encoding and the third trajectory encoding.

M. The method of paragraph F, wherein jointly training the trajectory encoder and the text encoder comprises: receiving a first text caption generated programmatically based at least in part on log data associated with the second object; receiving a second human-generated text caption associated with the second object; determining, using the text encoder, the second text encoding based at least in part on first text caption; and determining, using the text encoder, a third text encoding based at least in part on second text caption.

N. One or more non transitory computer readable media storing instructions executable by a processor, wherein the instructions, when executed, cause the processor to perform operations comprising: receiving input data including at least one of: trajectory data associated with a first object in an environment, or a text description associated with the first object in the environment; and determining, using a trained encoder and based at least in part on the input data, a first encoding, wherein: the trained encoder comprises a trajectory encoder and the first encoding comprises a trajectory encoding; or the trained encoder comprises a text encoder and the first encoding comprises a text encoding, wherein the trajectory encoder and the text encoder have been jointly trained, based at least in part on a similarity between a second trajectory encoding associated with a second object and a second text encoding associated with the second object.

O. The one or more non transitory computer readable media of paragraph N, wherein jointly training the trajectory encoder and the text encoder comprises: training, during a first training stage, a trained trajectory encoder; and training, during a second training stage after the first training stage, an object motion forecasting model including the trained trajectory encoder.

P. The one or more non transitory computer readable media of paragraph O, wherein the object motion forecasting model comprises: a first trained output head configured to predict, based at least in part on an output of the trained trajectory encoder, an intended destination of an agent in a driving environment; and a second trained output head configured to predict, based at least in part on the output of the trained trajectory encoder, a future trajectory of the agent in the driving environment.

Q. The one or more non transitory computer readable media of paragraph N, wherein the input data includes the text description, and wherein the text description indicates at least one of: a relationship between the first object and a different object in the environment; or a relationship between the first object and a map data feature in the environment.

R. The one or more non transitory computer readable media of paragraph N, wherein jointly training the trajectory encoder and the text encoder comprises: determining, based at least in part on the similarity between the second trajectory encoding and the second text encoding, a loss value; modifying the trajectory encoder, based at least in part on the loss value; and modifying the text encoder, based at least in part on the loss value.

S. The one or more non transitory computer readable media of paragraph N, wherein the text encoder comprises: a first set of transformer blocks associated with a large language model; and a second set of transformer blocks associated with descriptions of object movements in a driving environment, wherein jointly training the trajectory encoder and the text encoder comprises modifying the second set of transformer blocks.

T. The one or more non transitory computer readable media of paragraph N, wherein the trajectory encoder and the text encoder have been jointly trained, based at least in part on a second trajectory encoding associated with a second object, a second text encoding associated with the second object, a third trajectory encoding associated with a third object, a third text encoding associated with the third object, and wherein jointly training the trajectory encoder and the text encoder comprises: modifying at least one of the trajectory encoder or the text encoder to cause at least one of: increasing the similarity between the second trajectory encoding and the second text encoding; increasing a similarity between the third trajectory encoding and the third text encoding; increasing a dissimilarity between the second trajectory encoding and the third text encoding; or increasing a dissimilarity between the second text encoding and the third trajectory encoding.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving driving scene data associated with a driving environment;

receiving an object trajectory of an object in the driving environment;

receiving a text description associated with the object trajectory of the object;

determining, using a trajectory encoder, and based at least in part on the driving scene data and the object trajectory, a first trajectory encoding;

determining, using a text encoder, and based at least in part on the text description associated with the object trajectory, a first text encoding; and jointly training the trajectory encoder and the text encoder, wherein the jointly training comprises:

determining, based at least in part on a similarity between the first trajectory encoding and the first text encoding, a first loss associated with the trajectory encoder, and a second loss associated with the text encoder;

modifying the trajectory encoder, based at least in part on the first loss; and modifying the text encoder, based at least in part on the second loss.

2. The system of claim 1, wherein the text description indicates at least one of:

a relationship between the object and a second object in the driving environment; or a relationship between the object and a map data feature in the driving environment.

3. The system of claim 1, wherein the text encoder comprises:

a first set of transformer blocks associated with a large language model; and a second set of transformer blocks associated with descriptions of object movements in the driving environment, wherein jointly training the trajectory encoder and the text encoder comprises modifying the second set of transformer blocks.

4. The system of claim 1, wherein jointly training the trajectory encoder and the text encoder comprises:

training, during a first training stage, a trained trajectory encoder; and wherein the operations further comprise:

training, during a second training stage after the first training stage, an object motion forecasting model including the trained trajectory encoder.

5. The system of claim 4, the operations further comprising:

transmitting the object motion forecasting model to a vehicle, wherein the vehicle is configured to be controlled based at least in part on the object motion forecasting model.

* * * * *